United States Patent
Noguchi et al.

[11] Patent Number: 6,049,351
[45] Date of Patent: Apr. 11, 2000

[54] IMAGE FORMING APPARATUS

[75] Inventors: Junichi Noguchi; Shinobu Arimoto, both of Yokohama, Japan

[73] Assignee: Canon Kabushiki Kaisha, Tokyo, Japan

[21] Appl. No.: 09/079,165

[22] Filed: May 15, 1998

[30] Foreign Application Priority Data

May 19, 1997 [JP] Japan ................................. 9-128841

[51] Int. Cl.[7] .................................................. B41J 2/435
[52] U.S. Cl. ........................ 347/249; 347/248; 347/250; 347/116
[58] Field of Search .................................. 347/116, 260, 347/261, 247, 248, 250, 234, 235, 237, 249; 358/296

[56] References Cited

U.S. PATENT DOCUMENTS

| | | | |
|---|---|---|---|
| 4,580,171 | 4/1986 | Arimoto | 358/451 |
| 5,331,341 | 7/1994 | Egawa et al. | 347/261 |
| 5,424,763 | 6/1995 | Komiya et al. | 347/116 |
| 5,673,115 | 9/1997 | Arimoto | 358/296 |
| 5,724,152 | 3/1998 | Hayashi et al. | 358/296 |

*Primary Examiner*—N. Le
*Assistant Examiner*—Hai C. Pham
*Attorney, Agent, or Firm*—Fitzpatrick, Cella, Harper & Scinto

[57] ABSTRACT

It is an object to stably form a color image of a high quality without a color deviation by completing a phase adjustment in a short time so that a reference signal of a main scanning control system and a reference signal of a sub scanning control system have a predetermined phase. To accomplish the object, an output timing of an ITOP signal which is generated by a sensor 9 which detects a predetermined position of a photosensitive drum 5 which is rotated is compared with an output timing of a virtual main scanning sync signal BD' of a polygon mirror 3 for scanning a light beam onto the photosensitive drum 5 in the main scanning direction, thereby deciding an output timing of a reference clock SP. On the basis of the decided output timing, a PLL circuit 116 controls a rotational speed of a polygon motor 117 so that a difference between the reference clock SP which is outputted by a counter 83 and the ITOP signal have a predetermined phase difference.

6 Claims, 26 Drawing Sheets

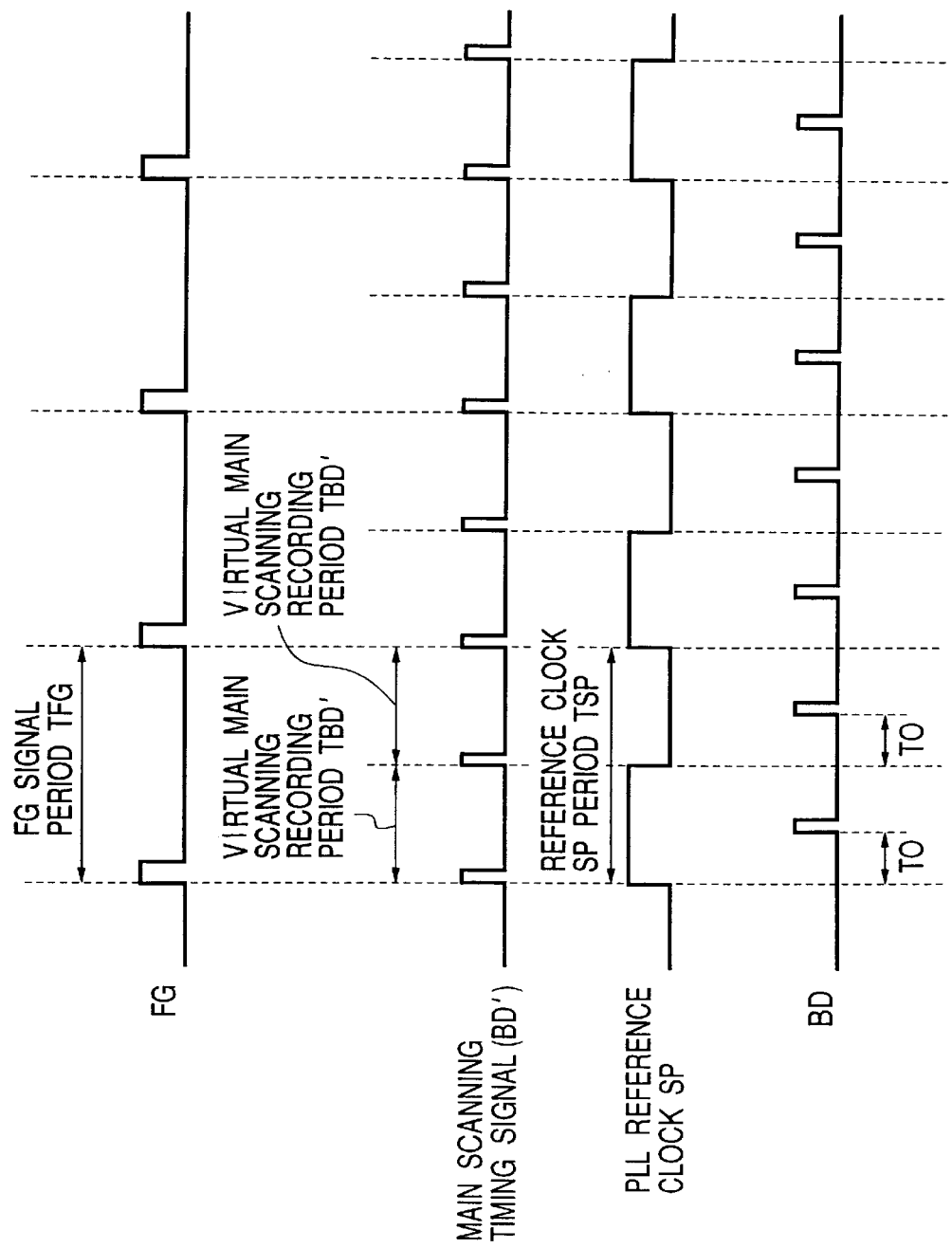

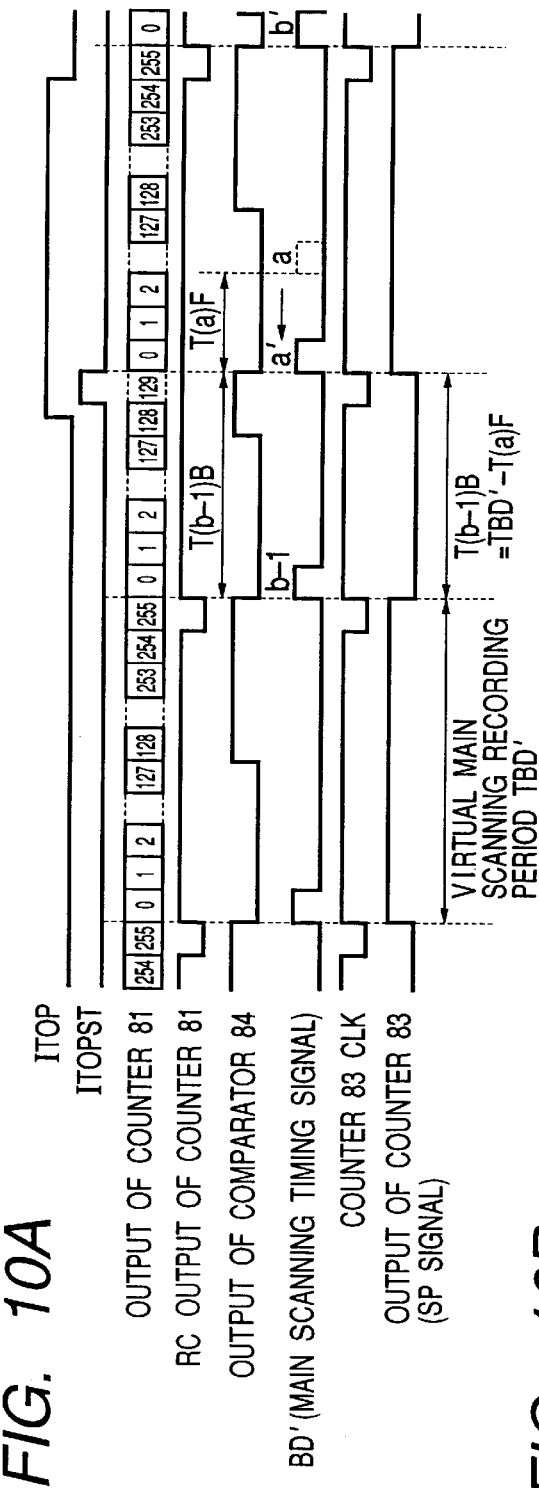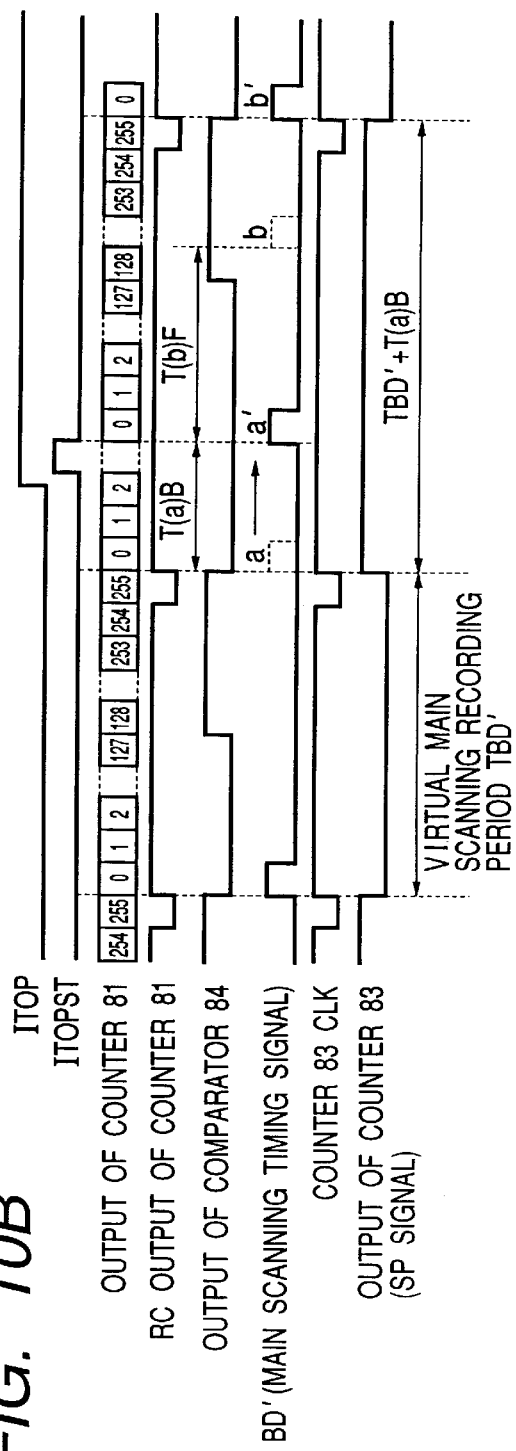

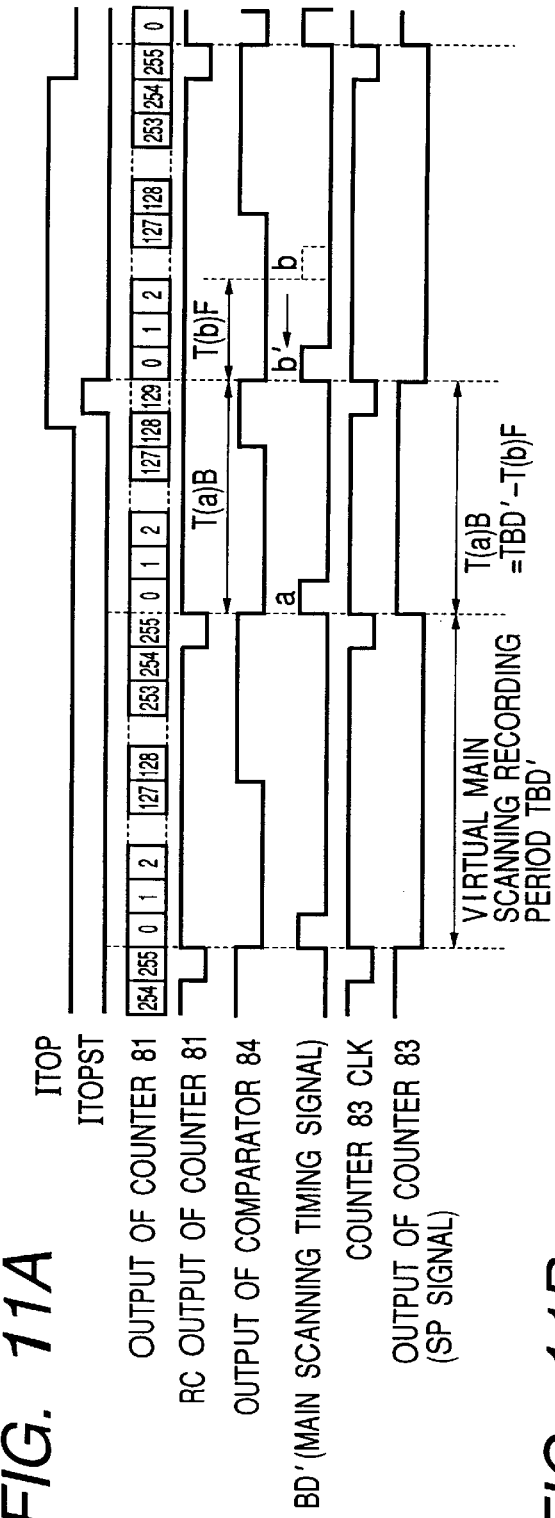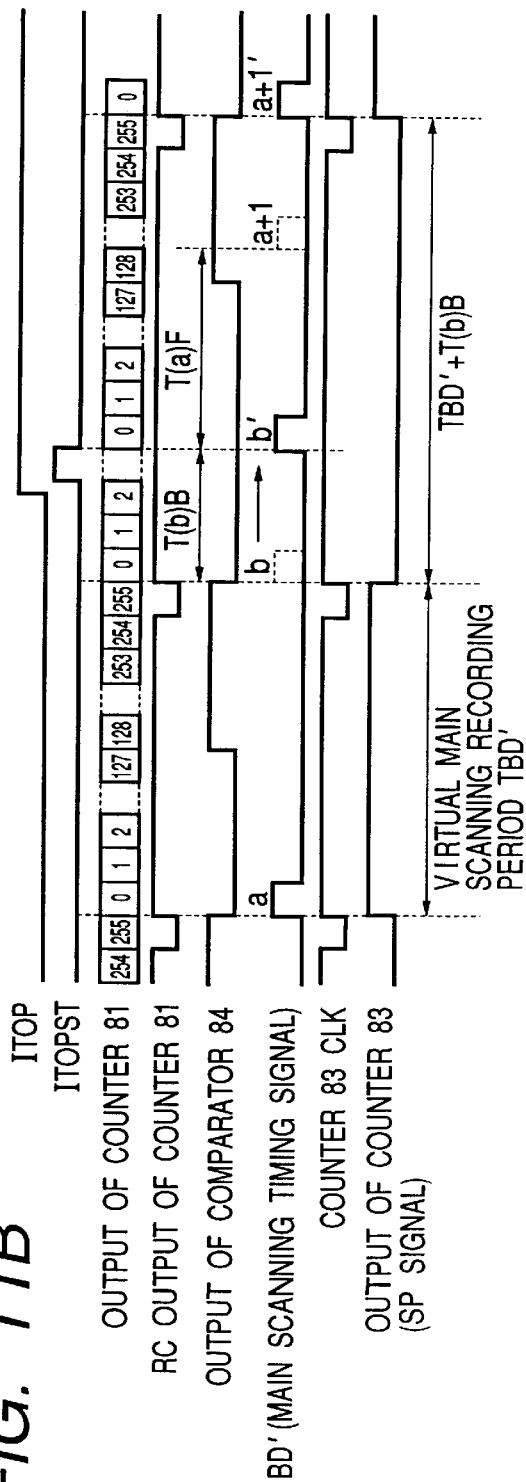

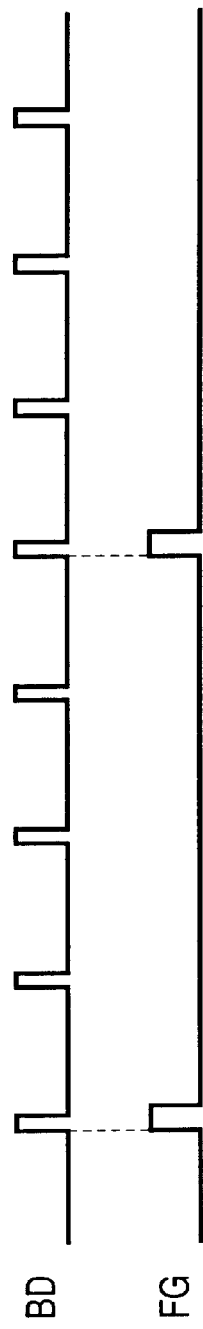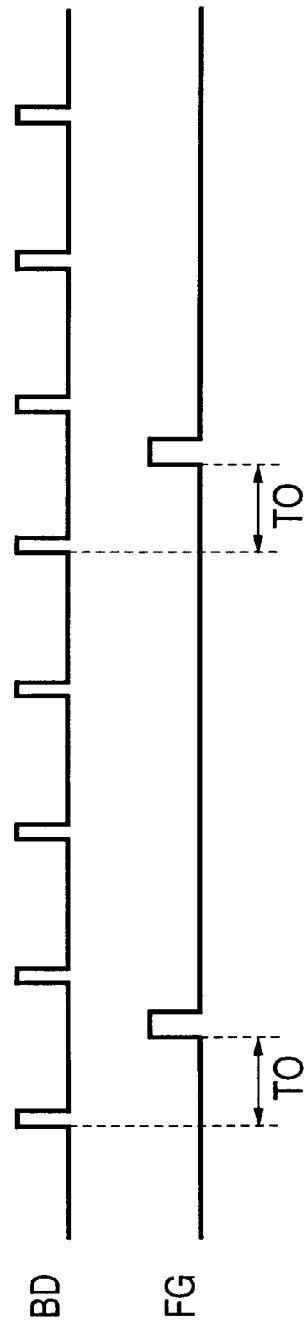

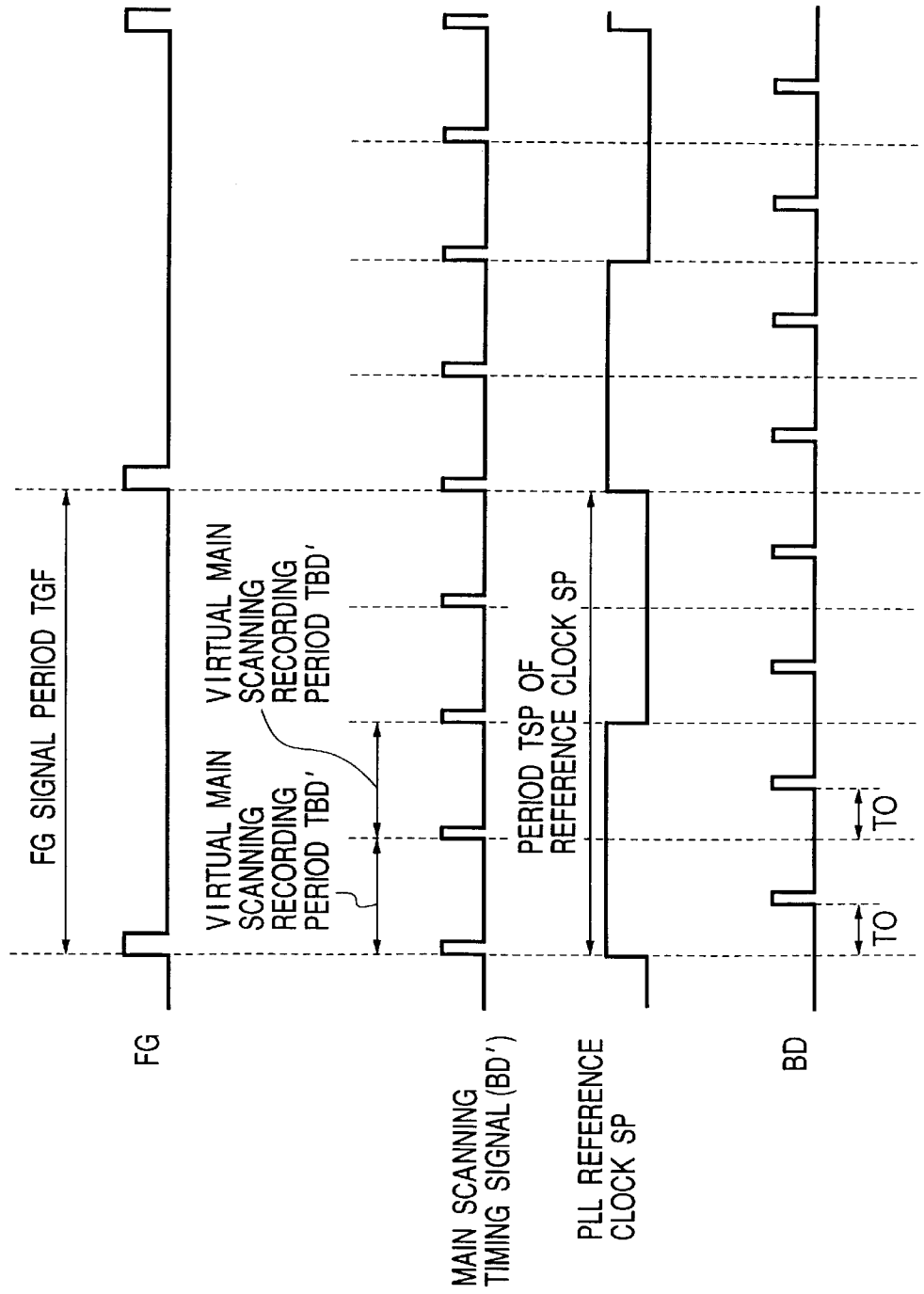

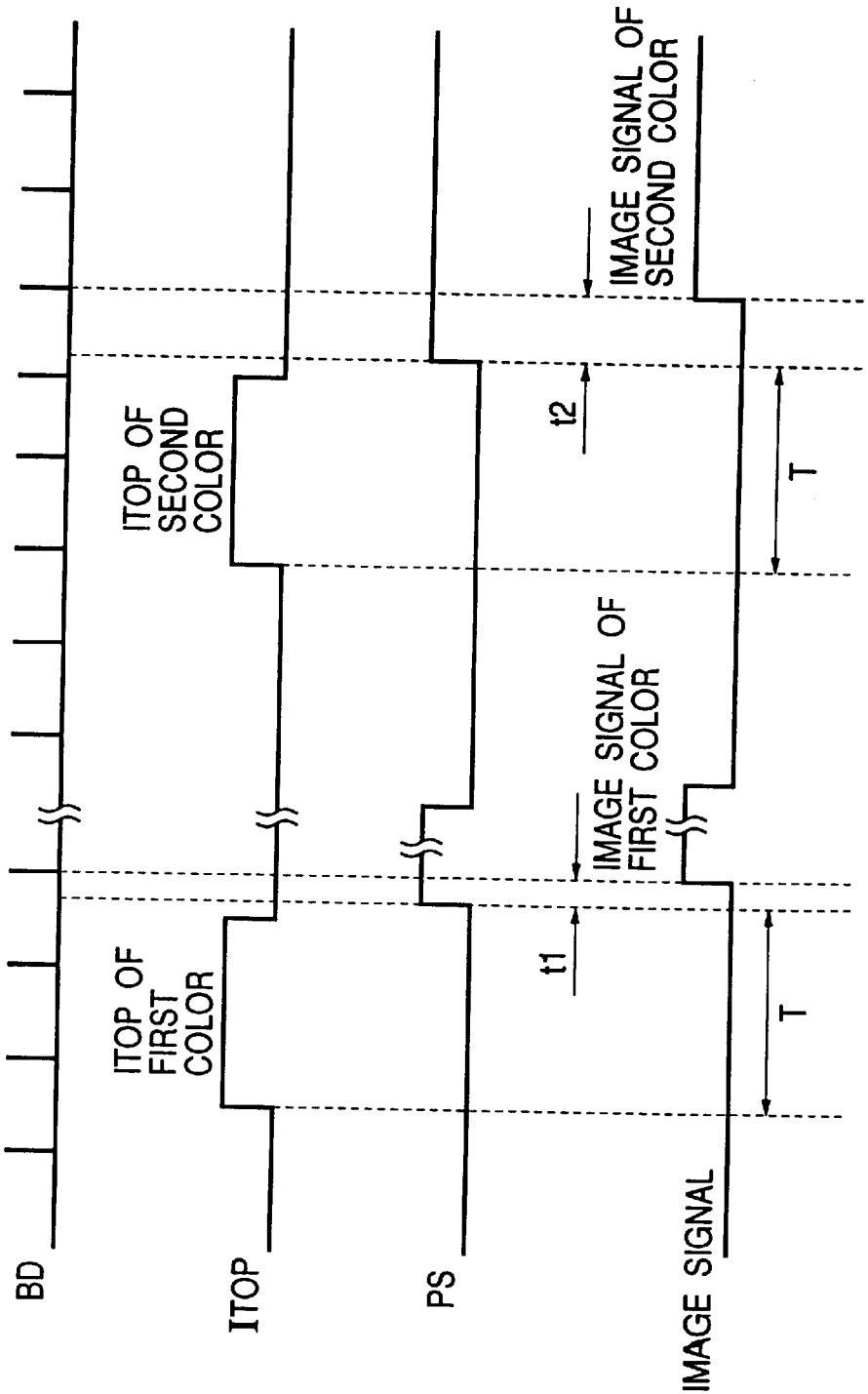

IMAGE FORMING APPARATUS

BACKGROUND OF THE INVENTION

1. Field of the Invention

The invention relates to an image forming apparatus for developing a latent image based on each color image onto an image holding material and superimposing and transferring the color images onto a recording medium, thereby forming a color image.

2. Related Background Art

As a conventional image forming apparatus for printing and outputting color image data, there is known an apparatus such that, like a laser beam printer (LBP), a latent image of each line is formed onto a photosensitive material by main scanning means such as a rotary polyhedron or the like for scanning laser irradiation light onto the photosensitive material, an image of each color element of the latent image is formed by using a developing agent of the color element of each of magenta (M), cyan (C), yellow (Y), black (BK), and the like, and the image of each color element is overlappingly transferred onto a paper fixed on a transfer drum, thereby forming a color image. An apparatus such that an image of each color element formed on the photosensitive material is color overlapped onto an intermediate transfer material and a color image on the intermediate transfer material is transferred onto a paper in aggregate has also been proposed.

In those apparatuses, the photosensitive material and the transfer drum or intermediate transfer material are driven at a predetermined speed in the direction (sub scanning direction) which perpendicularly crosses the main scanning direction and the color overlapping process is executed onto the paper on the transfer drum or the intermediate transfer material for every color each time the transfer drum or the intermediate transfer material is rotated once. Further, an apparatus such that the image of each recording color element is overlappingly formed on the photosensitive material and is transferred onto the recording paper in aggregate has also been proposed.

In those color image forming apparatuses, since the recording of each color element is independently performed, a resist matching of the image recording positions of the colors is performed to prevent a color deviation of the recording images. In the apparatus using the transfer drum or the intermediate transfer material, the photosensitive material and the transfer drum or the intermediate transfer material are driven at an almost equal speed and the latent image formation of each color is executed at a timing when the area where the image on the transfer drum or the intermediate transfer material is recorded is rotated and conveyed to a predetermined position for the transfer position, thereby performing the resist matching of the image recording positions of the colors. In the apparatus for color overlapping the image onto the photosensitive drum, the operation of the image formation is started when the head of the image forming area on the photosensitive material reaches a predetermined position for the image forming position of each color, thereby performing the resist matching of the image recording positions of the colors.

FIG. 27 is a diagram for explaining a construction of a resist matching control of the conventional image forming apparatus.

In the diagram, reference numeral 1 denotes an image writing timing control circuit for modulating a semiconductor laser 2 in accordance with each of color image signals [yellow (Y), magenta (M), cyan (C), black (BK)] which are transferred from an external device 18 such as image scanner, computer, or the like. The semiconductor laser 2 irradiates a laser beam by the driving of the image writing timing control circuit 1. Reference numeral 3 denotes a rotary polyhedron (polygon mirror) for reflecting the laser beam irradiated from the semiconductor laser 2. Reference numeral 4 denotes an f–θ lens for fθ correcting the laser beam reflected by the polygon mirror 3 and scanning and exposing onto a photosensitive drum 5, thereby forming an electrostatic latent image onto the photosensitive drum 5. Reference numeral 6 denotes a BD sensor which is disposed near a one-line scanning start position of the laser beam on the photosensitive drum 5 and detects a line scan of the laser beam and generates a main scanning start reference signal BD (BD signal) of each line. The image writing timing control circuit 1 drives the semiconductor laser 2 synchronously with the BD signal outputted from the BD sensor 6 in accordance with each color image signal which is transferred from the external device 18.

Developing devices of yellow (Y), magenta (M), cyan (C), and black (BK) (not shown) are arranged around the photosensitive drum 5 and develop toner images corresponding to the electrostatic latent images of yellow (Y), magenta (M), cyan (C), and black (BK) formed on the photosensitive drum 5.

Reference numeral 7 denotes a transfer drum for transferring toner images developed on the photosensitive drum 5 onto a recording paper 8 wrapped around the transfer drum 7. Reference numeral 9 denotes an optical sensor (sensor) such as a photointerrupter or the like. When a flag 10 fixed to the transfer drum 7 passes through the sensor 9, the light is shielded, so that the optical sensor 9 generates a sub scanning sync signal ITOP (ITOP signal) of each of the colors [yellow (Y), magenta (M), cyan (C), black (BK)]. The photosensitive drum 5 is rotated in the direction shown by an arrow in the diagram by a photosensitive drum driving motor (not shown). Further, the transfer drum 7 is interlocked with the photosensitive drum 5 through a gear and the like and is rotated in the direction of an arrow (sub scanning) at an equal speed synchronously with the photosensitive drum 5.

Reference numeral 19 denotes a delay circuit for transmitting a page sync signal PS obtained by delaying the ITOP signal outputted from the sensor 9 by a predetermined time T to the image writing timing control circuit 1.

Reference numeral 17 denotes a polygon motor for rotating the polygon mirror 3, for example, an octahedron which is axially supported. Reference numeral 16 denotes a phase locked loop (PLL) circuit for controlling the driving of the polygon motor 17 so as to always make the phase of a reference clock CLK that is generated from an oscillator (for example, quartz vibrator) 11 and the phase of an FG pulse (FG signal) that is generated from the polygon motor 17 coincident.

FIG. 28 is a timing chart showing a signal timing in each section shown in FIG. 27.

In the diagram, t1 and t2 denote times from the leading edge of the page sync signal PS obtained by delaying the ITOP signal outputted from the sensor 9 by the predetermined time T by the delay circuit 19 and outputting to an image signal output timing.

The operation of each section will now be described hereinbelow.

The image signal which is sent from the external device 18 such as image scanner, computer, or the like is supplied to the image writing timing control circuit 1. The image writing timing control circuit 1 modulates the semiconductor laser 2 in accordance with the image signal of each of magenta (M), cyan (C), yellow (Y), and black (BK). The laser beam which is irradiated by the semiconductor laser 2 is reflected by the rotary polyhedron mirror (polygon mirror) 3, is fθ corrected by the f–θ lens 4, scans on the photosensitive drum 5, and forms an electrostatic latent image onto the photosensitive drum 5.

The BD sensor 6 is disposed near the scan start position of one line of the laser beam, detects the line scan of the laser beam, and forms the BD signal of each line (FIG. 28). The BD signal is used to decide an output timing of the image signal of each line in the image writing timing control circuit 1 and is sent as a line sync signal to the external device 18, thereby obtaining the synchronization of the image transmission of each line from the external device 18.

Further, developing devices of magenta (M), cyan (C), yellow (Y), and black (BK) (not shown) are arranged around the photosensitive drum 5. While the photosensitive drum 5 rotates four times, the four developing devices alternately come into contact with the photosensitive drum 5 and develop images by toners corresponding to the electrostatic latent images of M, C, Y, and BK formed on the photosensitive drum 5. The toner images developed by the developing devices are transferred onto the recording paper 8 wrapped on the transfer drum 7.

The sensor 9 to generate an ITOP signal showing the head position of the recording paper 8 on the transfer drum 7 is arranged at the transfer drum 7. When the transfer drum 7 rotates and the flag 10 fixed to the transfer drum 7 passes through the sensor 9, the ITOP signal of each color in FIG. 28 is formed. The photosensitive drum 5 is rotated in the direction shown by an arrow by a photosensitive drum driving motor (not shown). Since the transfer drum 7 is connected to the photosensitive drum 5 through gears, it is rotated in the arrow direction (sub scanning direction) at an equal speed synchronously with the photosensitive drum 5.

The ITOP signal is delayed by a predetermined time by the delay circuit 19 and is supplied as a page sync signal PS to the image writing timing control circuit 1 and external device 18. As for the image signal generated synchronously with the page sync signal PS, a delay amount T of the delay circuit 19 is determined so that it is recorded to the head of the recording paper 8. As shown in FIG. 28, the PS signal is outputted after the elapse of only a predetermined delay time T after the detection of the leading edge of the ITOP signal.

To output an image of each line by the external device 18 or image writing timing control circuit 1 synchronously with the scan of every line by the laser, as shown in FIG. 28, the image signal is irradiated as laser modulation light onto the photosensitive drum 5 synchronously with the BD signal of the line which first arrives after the input of the page sync signal PS.

In the above conventional technique, however, although the BD signal is generated by the rotation of the polygon motor 17, since the ITOP signal and page sync signal PS are generated by the rotations of the photosensitive drum 5 and transfer drum 7, a generation timing of the BD signal and generation timings of the ITOP signal and page sync signal PS are not synchronized.

Therefore, the image signal output timing of each recording color is deviated by up to one line from the leading edge of the page sync signal PS indicative of the paper edge. A color deviation of up to one line occurs in the recording image obtained by overlapping the recording colors, so that there is a problem that an image quality deteriorates.

When the image is recorded, a method of controlling the photosensitive drum driving motor synchronously with the rotation of the polygon motor 17 so as to make the phases of the BD signal and ITOP signal coincide is also considered. However, since it is necessary to control the photosensitive drum driving motor at the absolute position, there are problems such that its control method is complicated, it is difficult to maintain the stability of the apparatus, costs are high, and the like.

Further, a method whereby the ITOP signal is used and, when the photosensitive drum 5 reaches a predetermined position, by resetting the reference clock CLK of the polygon motor 17, the phases of the BD signal and ITOP signal are made coincide has also been proposed.

However, since the rotation of the polygon motor 17 is suddenly changed in accordance with the position of the photosensitive drum 5, it takes time until the rotation of the polygon motor 17 is stabilized. There is, however, a problem such that when the speed of the apparatus rises, the formation of a next image has to be started before the rotation is stabilized, so that an image quality deteriorates.

SUMMARY OF THE INVENTION

The invention is made to solve the above problems and it is an object of the invention to provide an image forming apparatus in which a phase adjustment is completed in a short time so that a reference signal of a main scanning control system and a reference signal of a sub scanning control system are set to a predetermined phase, thereby enabling a color image of a high quality without a color deviation to be stably formed.

According to a preferred embodiment of the invention to accomplish the above object, there is provided an image forming apparatus comprising: a rotary polyhedron (for example, polygon mirror 3) for deflecting a light beam based on image information which is inputted and scanning onto an image holding material (for example, corresponding to a photosensitive drum 5 in the embodiment) which is rotated; first pulse generating means (for example, sensor 9) for detecting a predetermined position (for instance, fixed position of a flag 10) of the image holding material and generating a first pulse signal (for example, ITOP signal); driving means (for example, polygon motors 117, 217, 317) for driving the rotary polyhedron; second pulse generating means (for example, FG sensor, rotor 31, waveform shaping circuit 33, rotor 231) for generating second pulse signals (for example, FG signals) of a predetermined number in association with the rotation of the driving means; third pulse generating means (for example, up-counter 81, NOR circuit 82, comparator 84, NAND circuit 85, up-counter 281, comparator 284) for generating virtual main scanning sync signals (for example, BD' signals) of a predetermined number synchronized with the second pulse signals which are generated by the second pulse generating means; fourth pulse generating means (for example, counter 83, counter 283) for generating a reference signal (for example, reference clock SP) based on the virtual main scanning sync signals which are generated by the third pulse generating means; deciding means (for example, up-counter 81, NOR circuit 82, comparator 84, NAND circuit 85, up-counter 281, comparator 284) for comparing output timings of the virtual main scanning sync signals which are sequentially generated by the third pulse generating means and the first pulse signals, thereby deciding an output timing of the reference signal; and control means (for example, PLL circuits 116, 316) for controlling a rotational speed of the driving means so that a phase difference between the reference signal which is outputted on the basis of the output timing decided by the deciding means and the second pulse signals is made constant.

It is another feature of the invention that the deciding means (for example, up-counter 81, NOR circuit 82, comparator 84, NAND circuit 85, up-counter 281, comparator 284) decides the output timing of the reference signal (for example, reference clock SP) in a manner such that a phase difference between the virtual main scanning sync signal that is the most neighboring to the output timing of the first pulse signal (for example, ITOP signal) among the virtual main scanning sync signals (for example, BD' signals) which are sequentially generated by the third pulse generating means (for example, up-counter 81, NOR circuit 82, comparator 84, NAND circuit 85, up-counter 281, comparator 284) and the first pulse signal is set to a predetermined phase difference (for example, in case of the embodiment, a phase difference "0") (namely, the most neighboring virtual main scanning sync signal becomes, for example, a −BD' signal).

It is still another feature of the invention that the second pulse generating means (for example, FG sensor, rotor 31, waveform shaping circuit 33, rotor 231) generates pulses (for example, FG signals) of the number obtained by dividing the number of planes of the rotary polyhedron (for example, polygon mirror 3) by an integer every rotation which is driven by the driving means (for example, polygon motors 117, 217, 317).

It is further another feature of the invention that a period TSP of the reference signal (reference clock SP) is set to a value that is an integer times as large as that of the virtual main scanning sync signals (BD' signals).

It is further another feature of the invention that a period TFG of the second pulse signals (for example, FG signals) is the same as the period TSP of the reference signal (for example, reference clock SP).

It is further another feature of the invention that a period TFG of the second pulse signals (for example, FG signals) is set to a value that is twice as large as the period TSP of the reference signal (for example, reference clock SP).

The above and other objects and features of the present invention will become apparent from the following detailed description and the appended claims with reference to the accompanying drawings.

BRIEF DESCRIPTION OF THE DRAWINGS

FIG. 4 is a timing chart for explaining a signal timing in each section shown in FIG. 1;

FIGS. 10A and 10B are timing charts for explaining the operation in each section shown in FIG. 1;

FIGS. 11A and 11B are timing charts for explaining the operation in each section shown in FIG. 1;

FIGS. 15A and 15B are timing charts for explaining the relation between a BD signal from a BD sensor shown in FIG. 14 and an FG signal from a waveform shaping circuit;

FIG. 16 is a timing chart for explaining a signal timing in each section shown in FIG. 13;

FIG. 28 is a timing chart showing a signal timing in each section shown in FIG. 27.

DETAILED DESCRIPTION OF THE PREFERRED EMBODIMENTS

Figure 1:
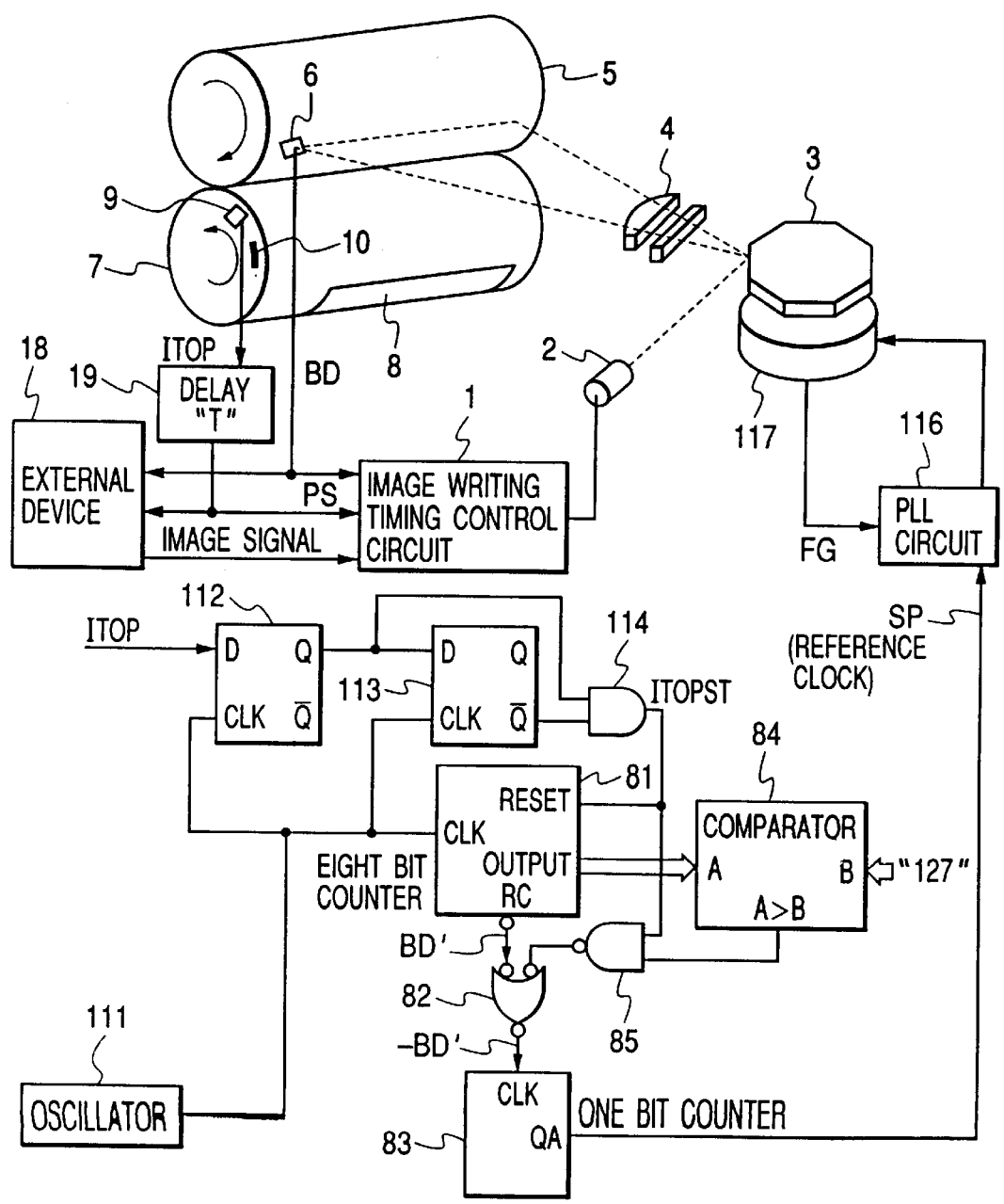
FIG. 1 is a diagram for explaining a construction of an image forming apparatus showing the first embodiment of the invention.
Figure 27:
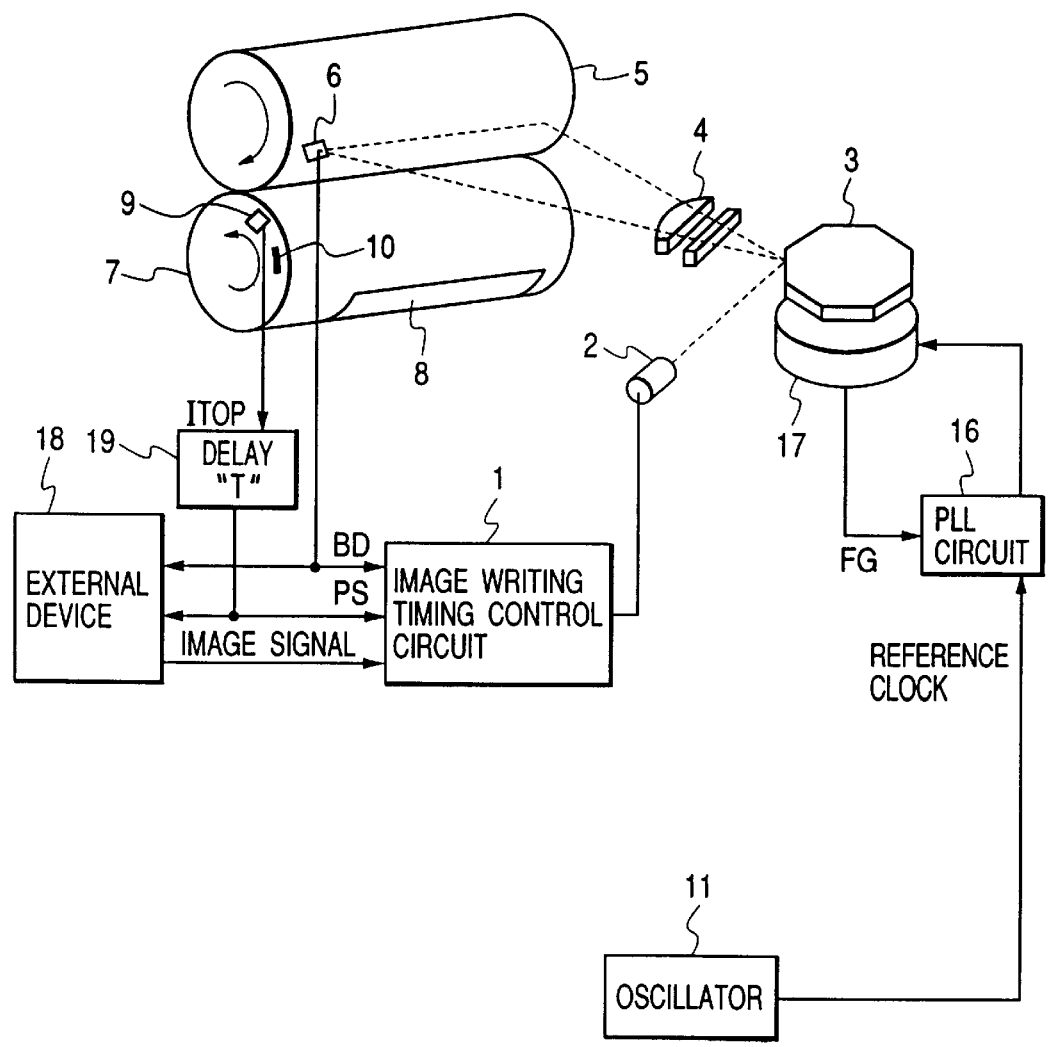
FIG. 27 is a diagram for explaining a construction of a resist matching control of a conventional image forming apparatus.

FIG. 1 is a diagram for explaining a construction of an image forming apparatus showing the first embodiment of the invention and the same component elements as those shown in FIG. 27 are designated by the same reference numerals.

In the diagram, reference numeral 117 denotes a polygon motor for rotating the polygon mirror 3, for example, an octahedron which is axially supported. Reference numeral 112 denotes a flip-flop circuit (DFF) in which an ITOP signal that is outputted from the sensor 9 is inputted to a D input terminal and a Q output is outputted to a flip-flop circuit 113 and an AND circuit 114 synchronously with a clock signal from an oscillator (for example, quartz vibrator) 111. In the flip-flop circuit 113, the output signal of the flip-flop circuit 112 is inputted to a D input terminal and an inversion output of a Q terminal is outputted to the AND circuit 114 synchronously with the clock signal from the oscillator 111.

The AND circuit 114 detects a leading edge of the ITOP signal by the AND of the Q output of the flip-flop circuit 112 and the inversion output of Q from the flip-flop circuit 113 and generates signals ITOPST (ITOPST signal) of one clock from the leading edge of the ITOP signal. The flip-flop circuits 112 and 113 and AND circuit 114 construct a leading edge detecting unit.

Reference numeral 81 denotes an up-counter of, for example, eight bits (8-bit up-counter) for counting the number of clock signals from the oscillator 111 and outputs a count value to a comparator 84. The up-counter 81 up-counts a period of time corresponding to one main scanning line up to "0 to 255". When a count value reaches "255", the up-counter 81 generates RC output signals (which become BD' signals, which will be explained hereinlater) at the "L" level of one clock to an NOR circuit 82. The ITOPST signal also serves as a reset signal of the up-counter 81. The NOR circuit 82 generates a BD signal –BD' signal (corresponding to the FG signal), which will be explained hereinlater.

The comparator 84 compares a clock count value of the up-counter 81 which is inputted to an A input terminal with a fixed value "127" which is inputted to a B input terminal and detects that the former half portion of the time corresponding to one main scanning line has been counted (the clock count value which is inputted to A≦the fixed value "127" which is inputted to B), thereby generating a signal at the "L" level to an NAND circuit 85. The comparator 84 detects that the latter half portion of the time corresponding to one main scanning line has been counted (the clock count value which is inputted to A>the fixed value "127" which is inputted to B), thereby generating a signal at the "H" level to the NAND circuit 85.

Reference numeral 83 denotes a counter of one bit (1-bit counter). The negative OR (–BD' signal) of the output signal from the up-counter 81 and the output signal (signal to decide the phase of the BD' signal) from the NAND circuit 85 is inputted from the NOR circuit 82 to a CLK input terminal of the 1-bit counter 83. A reference clock SP (SP signal) to PLL control the polygon motor 117 is generated from a QA output terminal. Reference numeral 116 denotes a phase locked loop (PLL) circuit which receives the reference clock SP (formed on the basis of the –BD' signal) which is outputted from the counter 83 and the FG pulses (FG signals) which are generated from the polygon motor 117 and controls the driving of the polygon motor 117 so as to always make their phases coincide.

In the embodiment, a peripheral velocity of the photosensitive drum 5 is set to, for instance, "160 mm/sec". In order to perform the recording at a recording density of, for example, "400 lines" per "one inch (about 25.4 mm)", a recording time per "one line" is set to "396.875 $\mu$sec". Therefore, clocks of "$256/(396.875 \times 10^{-6}) = 645.03937 \times 10^3$ Hz", namely, "645.03937 kHz" are inputted from the oscillator 111 to the up-counter 81 for counting the time corresponding to one main scanning line by "256" clocks of "0" to "255".

Figure 2:
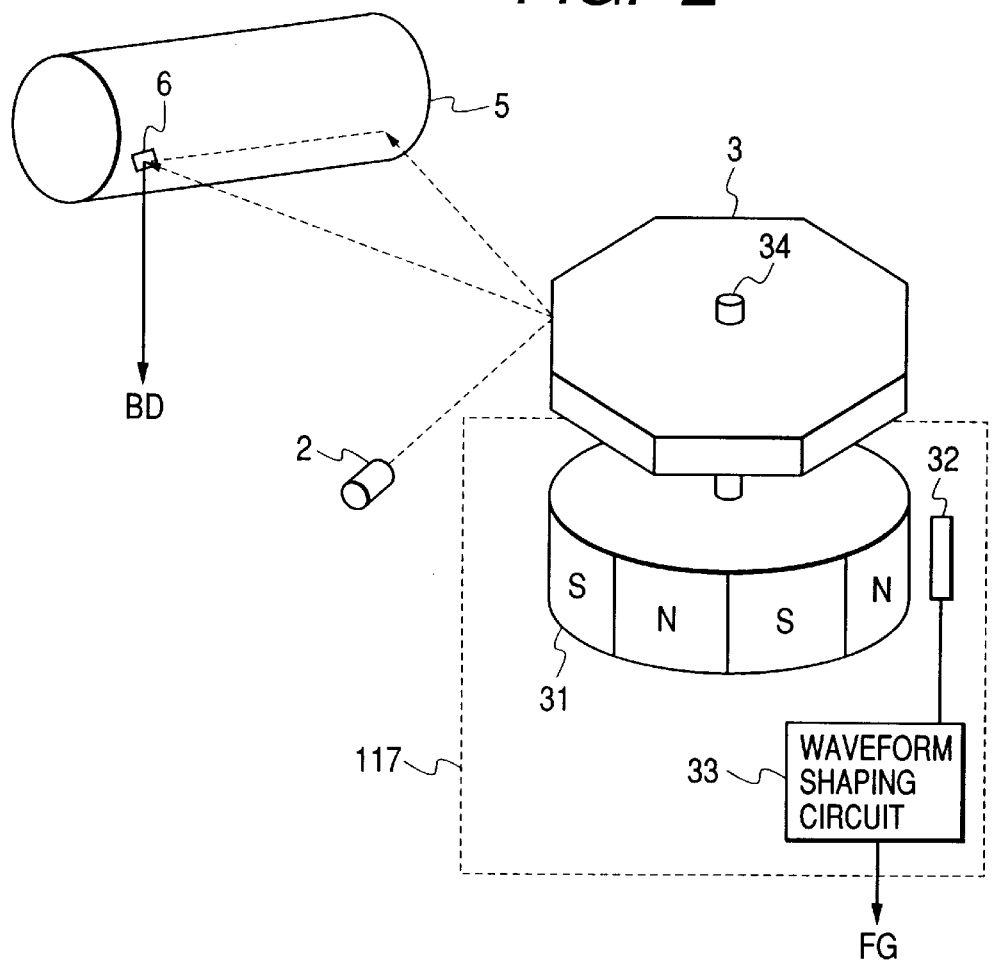
FIG. 2 is a diagram for explaining a construction of a polygon motor shown in FIG. 1.

FIG. 2 is a diagram for explaining a construction of the polygon motor 117 shown in FIG. 1. The same component elements as those shown in FIG. 1 are designated by the same reference numerals.

In the diagram, reference numeral 31 denotes a rotor of the polygon motor 117. Four sets of magnetic pole patterns per rotation have been magnetized on a permanent magnet. Reference numeral 34 denotes a fulcrum axis fixed to the rotor 31 and polygon mirror 3. Reference numeral 32 denotes an FG sensor for generating four pulses per rotation from the magnetic pole patterns magnetized on the rotor 31. Reference numeral 33 denotes a waveform shaping circuit for waveform shaping the pulses which are generated from the FG sensor 32 and outputting FG pulses (FG signals) to the PLL circuit 116. Consequently, the FG signals which are formed by the FG sensor 32 and FG waveform shaping circuit 33 are constructed so that four pulses per rotation of the polygon motor 117 are generated.

The polygon mirror 3 is a mirrored octahedron and rotates together with the rotor 31 in the same manner through the fulcrum axis 34 and scans a laser beam emitted from the semiconductor laser 2 onto the photosensitive drum 5. The laser beam which is scanned is detected by the BD sensor 6 and a BD signal is generated. Since eight BD signals are generated per rotation of the polygon motor 117, two BD signals are outputted while one FG signal is generated.

Figure 3A:
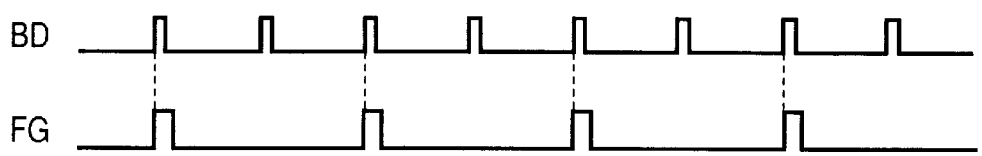
FIGS. 3A and 3B are timing charts for explaining the relation between a BD signal from a BD sensor shown in FIG. 2 and an FG signal from a waveform shaping circuit.
Figure 3B:
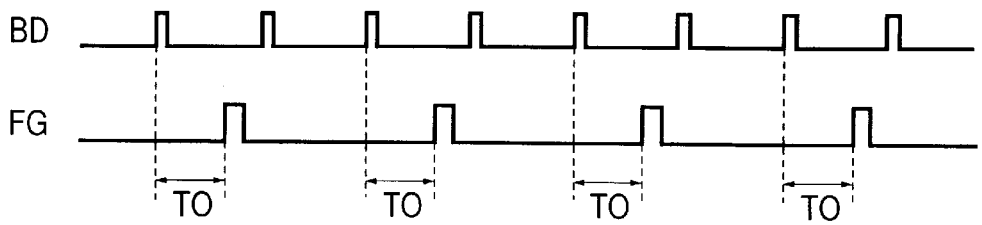

FIGS. 3A and 3B are timing charts for explaining the relation between the BD signal from the BD sensor 6 shown in FIG. 2 and the FG signal from the waveform shaping circuit 33. FIG. 3A shows a case where there is no phase difference between the BD signal and the FG signal. FIG. 3B shows a case where there is a phase difference between the BD signal and the FG signal.

As shown in FIG. 2, the polygon mirror 3 is an octahedron and the magnetic pole pattern of the rotor 31 generates four FG pulses per rotation, so that two BD signals are generated while one FG signal is outputted.

In the diagram, T0 denotes a phase difference and the BD signal is outputted with the phase difference time T0 while setting the FG signal to a reference point. Further, the phase difference time T0 changes depending on an attaching angle of the polygon mirror 3 to the polygon motor 117. When the polygon mirror 3 and polygon motor 117 are once assembled and fixed, the phase difference time T0 does not change. There is also a case where the phase difference is equal to "0" as shown in FIG. 3A due to the attaching angle between the polygon mirror 3 and polygon motor 117. It is sufficient that the phase difference is equal to either "0" or T0 so long as it is always constant.

So long as the relation of [(the number of FG pulses per rotation of the polygon motor 117)={(the number of planes of the polygon mirror 3)/n (n is a natural number)}] is satisfied, the phase difference time T0 is always constant. In the embodiment, the number of FG pulses (in case of the embodiment, "4") which are generated at regular intervals while the polygon motor 117 rotates once is set to "½" of the number of planes (in case of the embodiment, "8") of the polygon mirror 3 (that is, in case of n="2").

FIG. 4 is a timing chart for explaining a signal timing in each section shown in FIG. 1 and the same component elements as those shown in FIG. 3 are designated by the same reference numerals.

In the diagram, TFG denotes an FG signal period and TBD' indicates a virtual main scanning recording period. Since the FG signal period TFG corresponds to the rotation of two planes of the polygon mirror 3, two lines (two periods) are defined as a virtual main scanning period for the leading edge (period TFG of the FG signal) of the FG signal. BD' denotes a main scanning timing signal and is defined at the head in the defined virtual main scanning recording period TBD'. TSP denotes a period of the PLL reference clock SP and has an equal relation with the FG signal period TFG.

The phase difference between the BD signal and the FG signal which is actually detected by the BD sensor 6 is determined by the attaching angle of the polygon mirror 3 to the polygon motor 117 and occurs as a predetermined phase difference T0 for the FG signal as shown in FIGS. 3A and 3B. Therefore, the main scanning timing signal BD' (BD' signal) in the virtual main scanning recording period TBD' and the actual BD signal always have the predetermined phase relation T0. It is sufficient that the main scanning timing in the virtual main scanning recording period TBD' has a predetermined phase for the main scanning timing signal BD' and is not limited to the main scanning timing signal BD'.

It is inherently sufficient to always adjust the main scanning start signal BD of each line so as to have a predetermined phase for the sub scanning sync signal ITOP for the purpose of a color deviation correction. In the embodiment, however, one FG signal is generated when the BD signals corresponding to a plurality of lines are generated, and the FG signal is set to a predetermined phase for the sub scanning sync signal ITOP, thereby equivalently setting the BD signal so as to have a predetermined phase.

Further, to set the FG signal so as to have a predetermined phase for the sub scanning sync signal ITOP, in the invention, the virtual main scanning recording period TBD' that is defined in correspondence to the FG signal is defined, and a predetermined main scanning timing (in the embodiment, BD' itself) in the virtual main scanning recording period TBD' is matched with the ITOP signal in accordance with the input of the ITOP signal.

To match the BD' signal which is defined in correspondence to the FG signal with the ITOP signal, a rotational phase of the polygon motor 117 is adjusted. The adjustment of the rotational phase of the polygon motor 117 is performed by changing the phase of the reference clock SP for PLL controlling the polygon motor 117.

Further, when the phase of the reference clock SP is advanced, since the PLL circuit 116 PLL controls the phase of the FG signal by the polygon motor 117 so as to be matched with that of the reference clock SP, after the rotational speed of the polygon motor 117 was raised, by returning the rotational speed to the original speed, the rotational phase of the polygon motor 117 is progressed while keeping the speed. In case of delaying the phase of the reference clock S, after the rotation of the polygon motor 117 was delayed, by returning the rotational speed to the original speed, the rotational phase of the motor is delayed while keeping the speed.

According to the invention as mentioned above, since the rotational speed of the polygon motor 117 is changed, it takes a predetermined time until the rotational speed of the polygon motor 117 is returned to the constant rotational speed. The phase adjustment of the polygon motor for color deviation correction is realized by an interval (delay time T by the delay circuit 19) in which the formation of the latent image during one rotation of the photosensitive drum is not executed.

Figure 5:
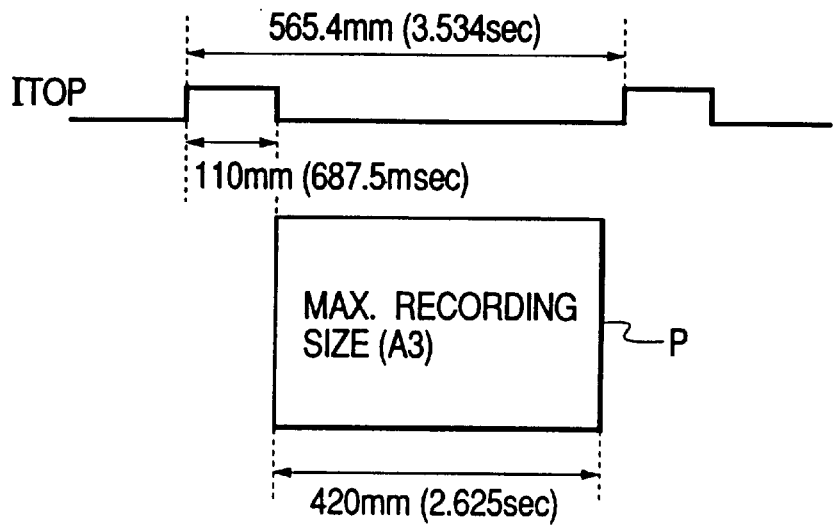
FIG. 5 is a diagram showing the relation between a transfer drum shown in FIG. 1 and an ITOP signal.

FIG. 5 is a diagram showing the relation between the transfer drum 7 shown in FIG. 1 and the ITOP signal.

In the diagram, P denotes a recording paper of the maximum recording size at which the image forming apparatus can record. Now, assuming that the transfer drum 7 shown in FIG. 1 is a transfer drum having a diameter of, for example, "180 mm", the recording paper P is a recording paper of the A3 size and a period of the ITOP signal of one rotation of the transfer drum 7 is equal to "565.4 mm". When it is assumed that the transfer drum 7 rotates at a peripheral velocity of, for example, "160 mm/sec" and the period of the ITOP signal is converted into the time, it is equal to "3.5234 seconds". Further, when it is assumed that the ITOP signal is generated for time of, for instance, "110 mm (687.5 msec)", a latent image per color is formed at the timing when the ITOP signal trails (the delay time T of the delay circuit 19 is equal to "687.5 msec").

In the embodiment, the phase adjustment of the polygon motor 117 is performed synchronously with the leading edge of the ITOP signal and the rotation of the polygon motor 117 has to be returned to the stable rotating state for the formation of the latent image within (delay time T of the delay circuit 19) "687.5 msec".

As an adjustment amount of the rotational phase of the polygon motor 117 to match the BD' signal with the ITOP signal is smaller, the time which is required until the rotation of the polygon motor 117 is returned to the stable rotating state is shorter.

A process for matching the BD' signal with the ITOP signal will now be described hereinbelow with reference to timing charts of FIGS. 6A to 6D.

FIGS. 6A to 6D are the timing charts for explaining the relations among the ITOP signal from the sensor 9 shown in FIG. 1, the FG signal from the waveform shaping circuit 33, and the main scanning timing signal BD' which is defined by the FG signal.

Although the explanation will be repeated, since the polygon mirror 3 is an octahedron, in the polygon motor 117, eight BD' signals are defined by one rotation (namely, four FG signals). In the embodiment, it is defined that the phase of the FG signal and the phase of one of the BD' signals are the same.

In FIGS. 6A to 6D, reference character a denotes a BD' signal which is defined by the leading edge of the FG signal. a+1 indicates a BD' signal which is defined by the leading edge of the FG signal that is one subsequent to the BD' signal a. b denotes a BD' signal which is defined between the FG signal and the FG signal. b−1 shows a BD' signal which is defined between the FG signal that is one-preceding to the BD' signal b and the FG signal.

−BD' denotes a BD' signal obtained by phase adjusting the BD' signal in accordance with the ITOP signal. −FG indicates an FG signal obtained by phase adjusting the FG signal in accordance with the ITOP signal. Further, for a BD' signal x (not shown), T(x)B indicates time from the BD' signal x to the ITOP signal which is inputted behind the BD' signal x. T(x)F shows time from the ITOP signal which is inputted in front of the BD' signal x to the BD' signal x. "x" is set to any one of "b−1", "a", "b", and "a+1".

Figure 6A:
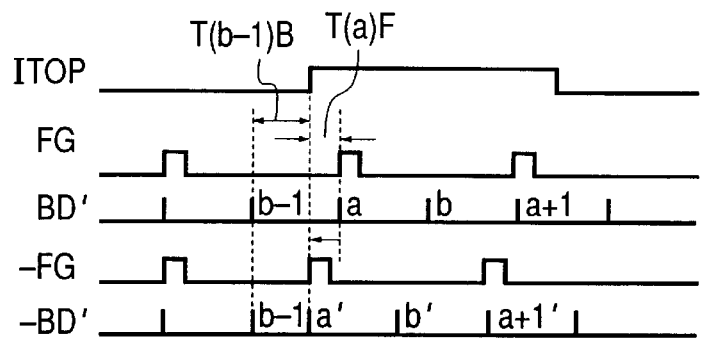
FIGS. 6A, 6B, 6C and 6D are timing charts for explaining the relations among the ITOP signal from a sensor shown in FIG. 1, the FG signal from the waveform shaping circuit, and a main scanning timing signal BD' which is defined by the FG signal.

Particularly, FIG. 6A shows a case where the ITOP signal is inputted between the BD' signal a and the one-preceding BD' signal b−1 and the relation between the BD' signal b−1 near the ITOP signal and a is set to T(b−1)B>T(a)F.

Since the BD' signal a is the most neighboring to the ITOP signal, as shown by the FG signal −FG (−FG signal) and the BD' signal −BD' (−BD' signal), the phase adjustment of the FG signal after the leading edge of the ITOP signal is performed so as to obtain a', b', and a+1' by matching the phase of the main scanning timing signal (BD' signal) a with the leading phase of the ITOP signal.

Figure 6B:
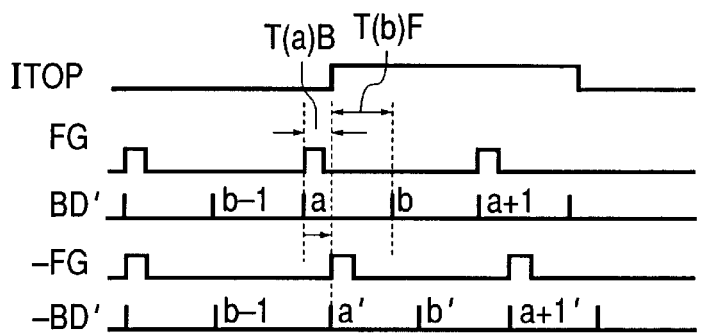

FIG. 6B shows a case where the ITOP signal is inputted between the BD' signal a and the one-subsequent BD' signal b and the relation between the BD' signal a near the ITOP signal and b has a relation of T(a)B<T(b)F.

Therefore, since the BD' signal a is the most neighboring to the ITOP signal, as shown by the FG signal −FG and the BD' signal −BD', the phase adjustment of the FG signal after the leading edge of the ITOP signal is executed so as to obtain a', b', and a+1' by matching the phase of the main scanning timing signal (BD' signal) a with the leading phase of the ITOP signal.

Figure 6C:
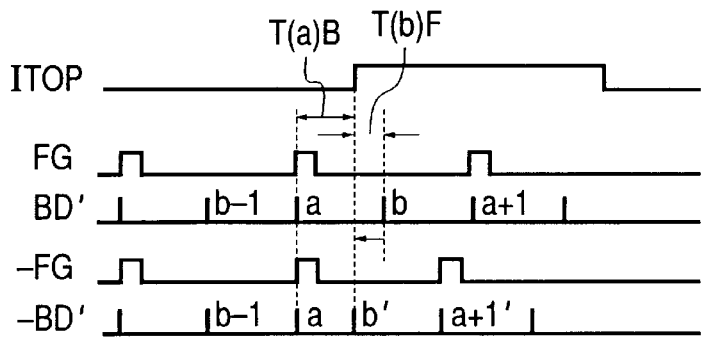

Further, FIG. 6C shows a case where the ITOP signal is inputted between the BD' signal a and the one-subsequent BD' signal b and the relation between the BD' signal a near the ITOP signal and b has a relation of T(a)B>T(b)F.

Therefore, since the BD' signal b is the most neighboring to the ITOP signal, as shown by the FG signal −FG and the BD' signal −BD', the phase adjustment of the FG signal after the leading edge of the ITOP signal is executed so as to obtain b' and a+1' by matching the phase of the main scanning timing signal (BD' signal) b with the leading phase of the ITOP signal.

Figure 6D:
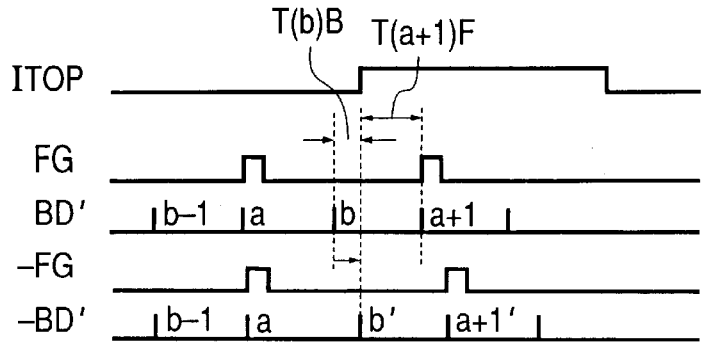

FIG. 6D shows a case where the ITOP signal is inputted between the BD' signal b and the one-subsequent BD' signal a+1 and the relation between the BD' signal b near the ITOP signal and a+1 has a relation of T(b)B<T(a+1)F.

Therefore, since the BD' signal b is the most neighboring to the ITOP signal, as shown by the FG signal −FG and the BD' signal −BD', the phase adjustment of the FG signal after the leading edge of the ITOP signal is executed so as to obtain b' and a+1' by matching the phase of the main scanning timing signal (BD' signal) b with the leading phase of the ITOP signal.

By the above method, the virtual main scanning sync signal which is the most neighboring to the input of the ITOP signal among the virtual main scanning sync signals BD' which are defined by the FG signal for the ITOP signal which is generated from the sensor 9 every recording color is matched with the phase of the ITOP signal, thereby minimizing the phase adjustment of the FG signal matched with the ITOP signal. The adjustment of the rotational phase of the polygon motor 117 can be executed in the shortest time.

Figure 7A:
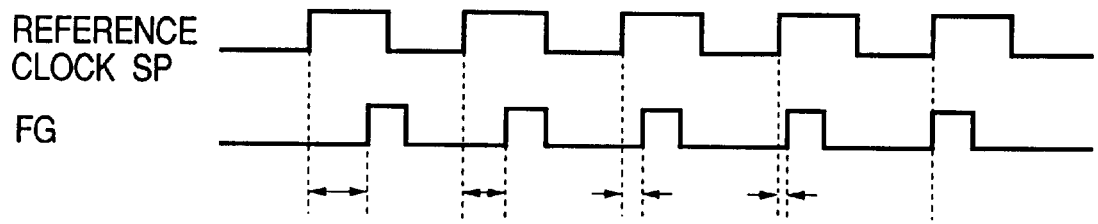
FIGS. 7A and 7B are timing charts for explaining the FG signal phase adjusting operation by a PLL circuit shown in FIG. 1.
Figure 7B:
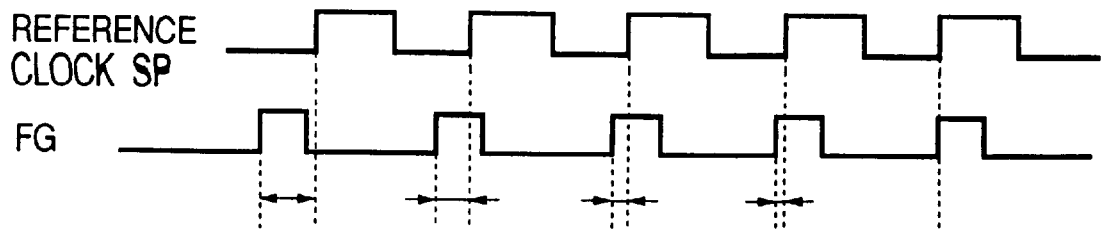

FIGS. 7A and 7B are timing charts for explaining the phase adjusting operation of the FG signal by the PLL circuit 116 shown in FIG. 1. In the embodiment, the PLL circuit 116 operates so as to match the phase of the leading edge of the reference clock SP with the leading phase of the FG signal from the polygon motor 117.

FIG. 7A shows a case where the FG signal is advanced from the reference clock SP. In this case, by rotating the polygon motor 117 fast, the phase of the FG signal can be matched with the reference clock SP.

FIG. 7B shows a case where the FG signal is delayed from the reference clock SP. In this case, by slowly rotating the polygon motor 117, the phase of the FG signal can be matched with the reference clock SP.

As a result of the PLL control by the PLL circuit 116 as mentioned above, the phases and periods of the reference clock SP and the FG signal coincide in the stationary rotating state, respectively. That is, as shown in FIG. 4, the FG signal and reference clock SP are considered as equivalent signals and the virtual main scanning recording period TBD' and main scanning timing signal BD' are also defined for the reference clock SP in a manner similar to the FG signal.

Thus, the operation to match the virtual main scanning timing signal BD' which is defined for the FG signal shown in FIGS. 6A to 6D with the ITOP signal is performed by defining the virtual main scanning timing signal BD' for the reference clock SP of the PLL, changing the phase of the reference clock SP for the ITOP signal, and matching the virtual main scanning timing signal BD' with the ITOP signal.

The control operation to match the phase of the reference clock SP with the ITOP signal will now be described hereinbelow with reference to timing charts of FIGS. 8A to 8D.

FIGS. 8A to 8D are timing charts for explaining the relations among the ITOP signal from the sensor 9 shown in FIG. 1, the reference clock SP from the counter 83, and the main scanning timing signal BD' which is defined by the reference clock SP.

In FIGS. 8A to 8D, a denotes a BD' signal which is defined by the leading edge of the reference clock SP. a+1 denotes a BD' signal which is defined by the leading edge of the one-subsequent reference clock SP of the BD' signal a. b indicates a BD' signal which is defined between the reference clock SP and the reference clock SP. b−1 shows a BD' signal which is defined between the one-preceding reference clock SP of the BD' signal b and the reference clock SP.

−SP denotes a reference clock SP signal obtained by phase adjusting the reference clock SP so as to match with the ITOP signal. −BD' indicates a BD' signal obtained by phase adjusting the BD' signal so as to match with the ITOP signal. Further, T(x)B shows time from the BD' signal x to the ITOP signal which is inputted behind the BD' signal x. T(x)F denotes time from the ITOP signal which is inputted before the BD' signal x to the BD' signal x. "x" is set to any one of b−1, a, b, and a+1.

Figure 8A:
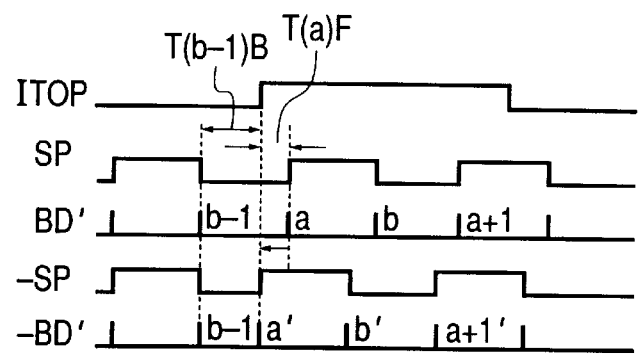
FIGS. 8A, 8B, 8C and 8D are timing charts for explaining the relations among the ITOP signal from the sensor shown in FIG. 1, a reference clock SP from a counter, and the main scanning timing signal BD' which is defined by the reference clock SP.

Particularly, FIG. 8A shows a case where the ITOP signal is inputted between the BD' signal a and the one-preceding BD' signal b−1 and the relation between the BD' signal b−1 near the ITOP signal and a is set to T(b−1)B>T(a)F and corresponds to FIG. 6A.

Therefore, since the BD' signal a is the most neighboring to the ITOP signal, as shown by the SP signal −SP and the BD' signal −BD', the phase adjustment of the reference clock SP after the leading edge of the ITOP signal is performed so as to obtain a', b', and a+1' by matching the phase of the main scanning timing signal (BD' signal) a with the leading phase of the ITOP signal.

Figure 8B:
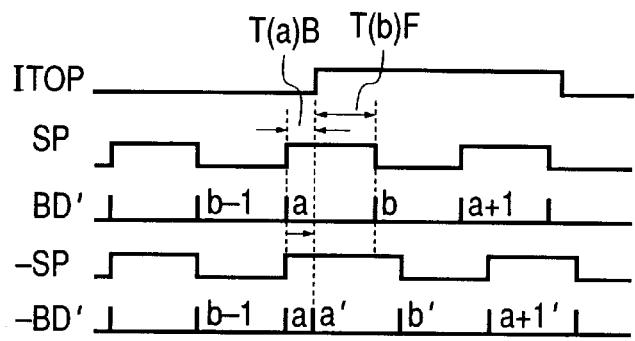

FIG. 8B shows a case where the ITOP signal is inputted between the BD' signal a and the one-subsequent BD' signal b and the relation between the BD' signal a near the ITOP signal and b is set to T(a)B<T(b)F and corresponds to FIG. 6B.

Therefore, since the BD' signal a is the most neighboring to the ITOP signal, as shown by the SP signal −SP (−SP signal) and the BD' signal −BD' (−BD' signal), the phase adjustment of the reference clock SP after the leading edge of the ITOP signal is performed so as to obtain a', b', and a+1' by matching the phase of the main scanning timing signal (BD' signal) a with the leading phase of the ITOP signal.

Figure 8C:
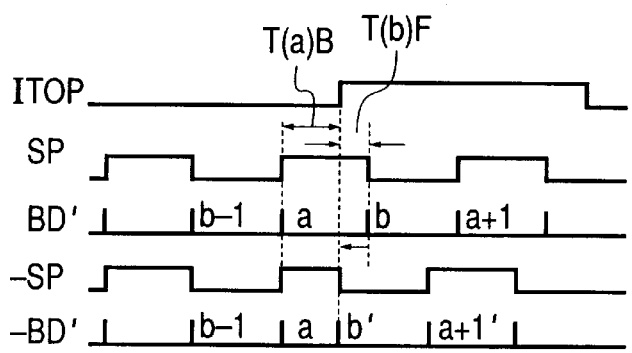

FIG. 8C shows a case where the ITOP signal is inputted between the BD' signal a and the one-subsequent BD' signal b and the relation between the BD' signal a near the ITOP signal and b is set to T(a)B>T(b)F and corresponds to FIG. 6C.

Therefore, since the BD' signal b is the most neighboring to the ITOP signal, as shown by the SP signal –SP and the BD' signal –BD', the phase adjustment of the reference clock SP after the leading edge of the ITOP signal is performed so as to obtain b' and a+1' by matching the phase of the main scanning timing signal (BD' signal) b with the leading phase of the ITOP signal.

Figure 8D:
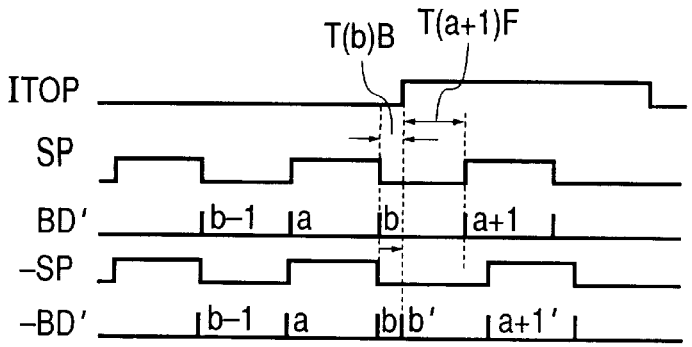

FIG. 8D shows a case where the ITOP signal is inputted between the BD' signal b and the one-subsequent BD' signal a+1 and the relation between the BD' signal b near the ITOP signal and a+1 is set to T(b)B <T(a+1)F and corresponds to FIG. 6D.

Therefore, since the BD' signal b is the most neighboring to the ITOP signal, as shown by the SP signal –SP and the BD' signal –BD', the phase adjustment of the reference clock SP after the leading edge of the ITOP signal is performed so as to obtain b' and a+1' by matching the phase of the main scanning timing signal (BD' signal) b with the leading phase of the ITOP signal.

By the above method, the virtual main scanning sync signal BD' that is the most neighboring to the input of the ITOP signal among the virtual main scanning sync signals BD' which are defined by the reference clock SP for the ITOP signal that is generated from the sensor 9 every recording color is matched with the phase of the ITOP signal, so that the phase adjustment of the reference clock SP matched with the ITOP signal can be minimized.

The PLL circuit 116 drives the polygon motor 117 so as to match the phase of the adjusted reference clock SP with that of the FG signal of the polygon motor 117, thereby performing the phase adjustment of the FG signal in a manner such that the virtual main scanning sync signal BD' which is the most neighboring to the input of the ITOP signal among the virtual main scanning sync signals BD' which are defined by the FG signal for the ITOP signal which is outputted by the sensor 9 every recording color is matched with the phase of the ITOP signal. The adjustment of the rotational phase of the polygon motor 117 is performed in the shortest time and a color image of a high quality without a color deviation can be stably formed.

The phase adjusting operation of the reference clock SP by the input of the ITOP signal will now be described hereinbelow with reference to FIGS. 9, 10A, 10B, 11A, 11B, 12A and 12B.

Figure 9:
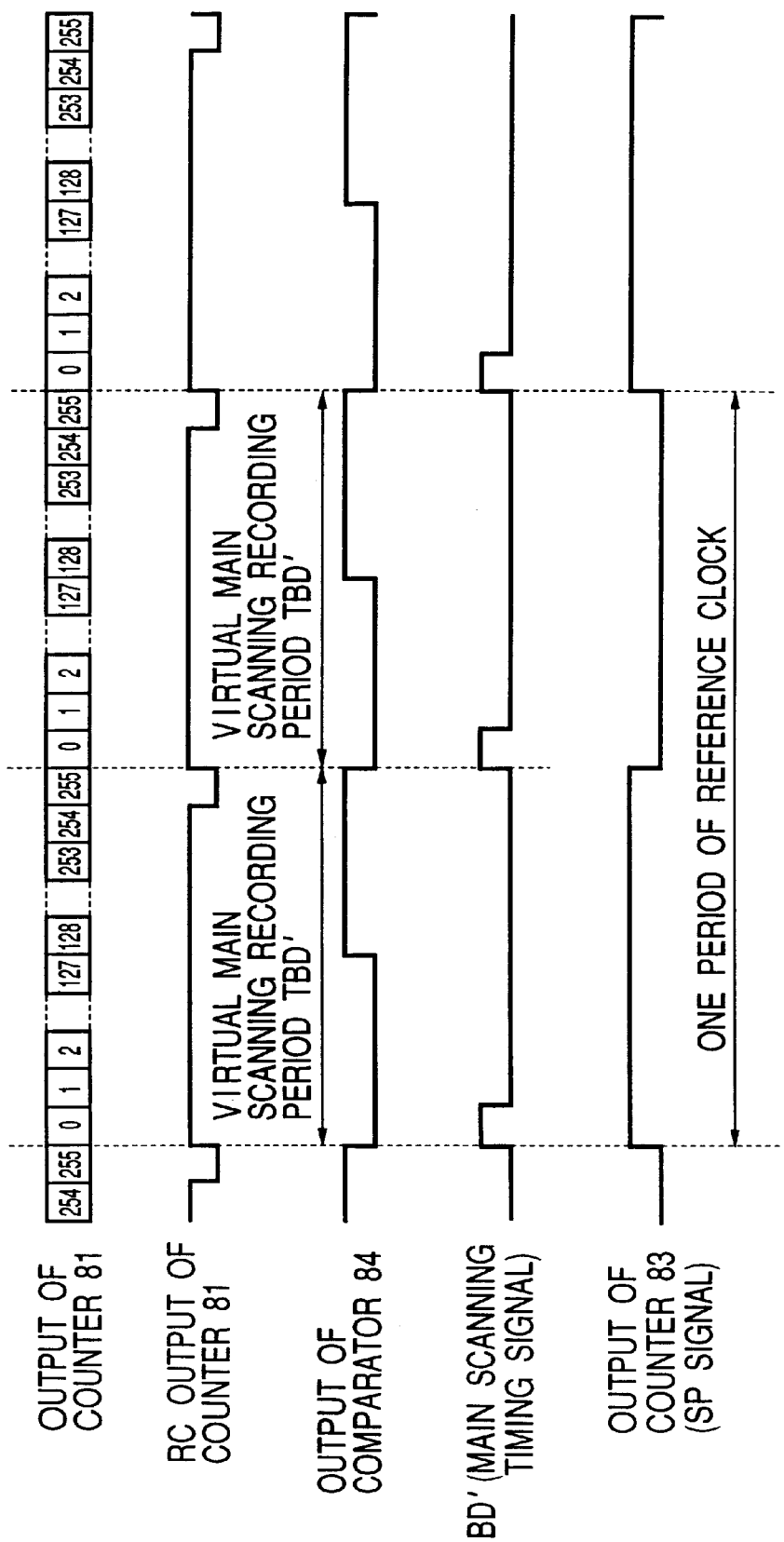
FIG. 9 is a timing chart for explaining the operation in each section shown in FIG. 1.

FIG. 9 is a timing chart for explaining the operation in each section shown in FIG. 1.

In the diagram, as mentioned above, the clocks of "645.03937 kHz" are inputted from the oscillator 111 to the up-counter 81 and the up-counter counts the "256" clocks (virtual main scanning recording period TBD') of "0to 255".

When the up-counter 81 counts up to "255" (namely, at the end of the virtual main scanning recording period TBD'), RC output signals of "L" as much as one clock are generated and are clock inputted through the OR gate (NOR gate) 82 of the negative logic to the counter 83 for outputting the SP signal. The reference clocks SP in which an interval of two lines of the virtual main scanning recording period TBD' is set to one period (namely, the same period as that of the FG signals) are generated from the QA output terminal of the counter 83.

As mentioned above, in the embodiment, the QA output of the counter 83 shown in FIG. 1 is the reference clock SP of the PLL corresponding to the FG signal. The main scanning recording period TBD' is virtually determined by the up-counter 81 of eight bits which circles twice for one period of the reference clock SP. It is also defined that the main scanning timing signal BD' is generated when the count value of the up-counter 81 is equal to "0" (namely, at the start of the virtual main scanning recording period TBD'). Further, when the up-counter 81 counts the former half portion ("0 to 127") of one period, the comparator 84 generates the "L" level signal. When the up-counter 81 counts the latter half portion ("128 to 255") of one period, the comparator 84 generates the "H" level signal.

When the ITOP signal is inputted for an interval when the output of the comparator 84 is at the "H" level, the main scanning timing signal BD' at the head of the next period of the virtual main scanning recording period TBD' which is being counted at present by the counter 81 is nearer. Therefore, the up-counter 81 is returned to "0" so as to make the next virtual main scanning recording period TBD' correspond to the leading edge of the inputted ITOP signal and the QA output of the counter 83 is inverted by the CLK input to the counter 83, thereby performing the phase adjustment of the reference clock SP.

On the other hand, when the ITOP signal is inputted for an interval when the output of the comparator 84 is at the "L" level, the phase adjustment of the reference clock SP is executed by returning (resetting) the up-counter 81 to "0" so that the main scanning timing signal BD' (which has already been generated) at the head of the virtual main scanning recording period TBD' which is being counted by the up-counter 81 when the ITOP signal is inputted is regenerated in response to the leading edge of the inputted ITOP signal.

FIGS. 10A, 10B, 11A, and 11B are timing charts for explaining the operation in each section shown in FIG. 1 and the same component elements as those shown in FIGS. 8A to 8D are designated by the same reference numerals.

Particularly, FIG. 10A corresponds to FIG. 8A and shows a case where the phase adjustment of the reference clock SP is performed so that the main scanning timing signal a' corresponding to the next virtual main scanning recording period TDB' is generated for the leading edge of the ITOP signal inputted for an interval when the reference clock SP is at the "L" level.

In this case, as described above in FIG. 8A, time until the main scanning timing signal b–1 at the head of the virtual main scanning recording period which is being counted at present by the counter 81 for the generation of the leading detection signal ITOPST signal of the ITOP signal is equal to T(b–1)B and time until the next main scanning timing signal a is equal to T(a)F and T(b–1)B>T(a)F. Therefore, the main scanning timing signal a' is generated so as to make the most neighboring main scanning timing signal a correspond to the ITOPST signal, thereby performing the phase adjustment of the reference clock SP.

The relation of T(b–1)B>T(a)F, namely, a fact that the next main scanning timing signal a is the most neighboring is detected by checking that the output of the comparator 84 is at the "H" level at the time of generation of the ITOPST signal.

In this case, since the output of the comparator 84 is at the "H" level when the ITOPST signal is generated, the NAND gate 85 is opened and the ITOPST signal is supplied to the clock terminal of the counter 83. Thus, the reference clock SP changes to the "H" level due to the generation of the ITOPST signal and the next virtual main scanning recording period is generated in response to the ITOPST signal. Further, the up-counter 81 is reset to "0" by the generation of the ITOPST signal. The main scanning timing signal a is generated as a' in correspondence to the ITOPST signal.

Thus, the "L" interval of the SP signal before the ITOPST signal is inputted is equal to T(b−1)B which is shorter than the ordinary virtual main scanning recording period TBD' by only T(a)F.

The flip-flop circuits 112 and 113 delay the ITOP signal by two clocks from the input. Actually, although the Q output of the flip-flop circuit 112 is set to the "H" level synchronously with the clock just after the leading edge of the ITOP signal (with a delay of up to "one" clock from the leading edge of the ITOP signal), the Q output of the flip-flop circuit 113 is held at the "L" level (the inversion output of Q is at the "H" level) and the output of the AND gate 114 is set to the "H" level. By the next clock (which is delayed by up to "two" clocks from the leading edge of the ITOP signal), the Q output of the flip-flop circuit 113 is also set to the "H" level (the inversion output of Q is at the "L" level) and the output of the AND circuit 114 is returned to "L". That is, the AND circuit 114 generates the ITOPST signal of "one" clock with a delay of up to "one" clock from the leading edge of the ITOP signal.

FIG. 10B corresponds to FIG. 8B and shows a case where the phase adjustment of the SP signal is performed so that the main scanning timing signal a (which has already been generated) corresponding to the virtual main scanning recording period which is at present being counted by the up-counter 81 is regenerated as a' in response to the leading edge of the ITOP signal inputted for an interval when the reference clock SP is at the "H" level.

In this case, as described in FIG. 8B, time until the main scanning timing signal a at the head of the virtual main scanning recording period which is being counted at present by the up-counter 81 for the generation of the ITOPST signal is equal to T(a)B and time until the next main scanning timing signal b is equal to T(b)F and T(a)B<T(b)F. Therefore, the phase of the SP signal is adjusted so as to make the most neighboring main scanning timing signal a correspond to the ITOPST signal as a leading signal of the ITOP signal.

The relation of T(a)B<T(b)F, namely, a fact that the main scanning timing signal a is the most neighboring for the ITOPST signal is detected by checking that the output of the comparator 84 is at the "L" level at the time of generation of the ITOPST signal.

In this case, since the output of the comparator 84 is at the "L" level when the ITOPST signal is generated, the NAND gate 85 is not opened and the ITOPST signal is not supplied to the clock terminal of the counter 83. Thus, the reference clock SP is held at the "H" level even if the ITOPST signal is generated, and the present virtual main scanning recording period is restarted in response to the ITOPST signal.

The up-counter 81 is reset to "0" by the generation of the ITOPST signal. The main scanning timing signal a is generated as a' in correspondence to the ITOPST signal. Thus, the "H" interval of the reference clock SP corresponding to the input of the ITOPST signal is equal to TBD'+T(a)B which is longer than the ordinary virtual main scanning recording period TBD' by only T(a)B.

Further, FIG. 11A corresponds to FIG. 8C. Time until the head main scanning timing signal a of the virtual main scanning recording period which is at present being counted by the counter 81 for the generation of the ITOPST signal inputted in an interval when the reference clock SP is at the "H" level is equal to T(a)B and time until the next main scanning timing signal b is equal to T(b)F and there is a relation of T(a)B>T(b)F. Therefore, the phase adjustment of the SP signal is performed so as to make the most neighboring main scanning timing signal b correspond to the ITOPST signal as a leading signal of the ITOP signal.

The relation of T(a)B>T(b)F, namely, a fact that the next main scanning timing signal b is the most neighboring is detected by checking that the output of the comparator 84 is at the "H" level at the time of generation of the ITOPST signal.

In this case, since the output of the comparator 84 is at the "H" level when the ITOPST signal is generated, the NAND gate 85 is opened and the ITOPST signal is supplied to the clock terminal of the counter 83. Thus, the reference clock SP is changed to the "L" level due to the generation of the ITOPST signal and the next virtual main scanning recording period is generated in response to the ITOPST signal.

The up-counter 81 is reset to "0" by the generation of the ITOPST signal. The main scanning timing signal b is generated as b' in correspondence to the ITOPST signal. Thus, the "H" interval of the reference clock SP other than the input of the ITOPST signal is equal to T(a)B which is shorter than the ordinary virtual main scanning recording period TBD' by only T(b)F.

FIG. 11B corresponds to FIG. 8D and shows a case where the phase adjustment of the reference clock SP is performed so that the main scanning timing signal b corresponding to the virtual main scanning recording period which is at present being counted is regenerated as b' in response to the leading edge of the ITOP signal inputted in an interval when the reference clock SP is at the "L" level.

In this case, as described in FIG. 8D, time until the head main scanning timing signal b of the virtual main scanning recording period which is at present being counted by the up-counter 81 for the generation of the ITOPST signal is equal to T(b)B and time until the next main scanning timing signal a+1 is equal to T(a−1)F and there is a relation of T(b)B>T(a−1)F. Therefore, the phase of the SP signal is adjusted so as to make the most neighboring main scanning timing signal b correspond to the ITOPST signal as a leading signal of the ITOP signal.

The relation of T(b)B<T(a−1)F, namely, a fact that the main scanning timing signal b is the most neighboring for the ITOPST signal is detected by checking that the output of the comparator 84 is at the "L" level at the time of generation of the ITOPST signal.

In this case, since the output of the comparator 84 is at the "L" level when the ITOPST signal is generated, the NAND gate 85 is not opened and the ITOPST signal is not supplied to the clock terminal of the counter 83. Thus, the reference clock SP is held at the "L" level even if the ITOPST signal is generated, and the present virtual main scanning recording period is restarted in response to the ITOPST signal.

The up-counter 81 is reset to "0" by the generation of the ITOPST signal. The main scanning timing signal b is generated as b' in correspondence to the ITOPST signal. Thus, the "H" interval of the reference clock SP corresponding to the input of the ITOPST signal is equal to TBD'+T(b)B which is longer than the ordinary main scanning recording period TBD' by only T(b)B.

In the embodiment, four FG signals are generated per rotation of the polygon motor 117 and one FG signal corresponds to two main recording scanning lines.

As mentioned above, in case of matching the FG signal of the polygon motor 117 with the sub scanning sync signal ITOP, hitherto, it is necessary to perform the phase adjustment as much as up to "±1" line. In the embodiment, however, one period of the FG pulse and reference clock SP is divided at the virtual main scanning recording period of two lines, the main scanning timing is determined every main scanning recording period, and the main scanning recording timing is phase matched with the ITOP input. Therefore, it is sufficient to perform the phase adjustment as much as up to "±0.5" line. The rotational phase of the polygon motor 117 can be adjusted in the shortest time. Therefore, a color image of a high quality without a color deviation can be stably formed.

Phase adjustment errors in this instance are determined by precision at which the ITOP signal is latched by the clock from the oscillator 111. The errors are suppressed to up to errors as much as "one" clock among the clocks of the oscillator 111.

In the embodiment, since the frequency of the oscillator 111 is 256 times as high as the line recording frequency, the color deviation correction is executed by errors of 1/256 of one line.

It is, therefore, necessary to suppress the color deviation amount to up to 1/10 line so as to make the color deviation inconspicuous. For this purpose, the clock frequency from the oscillator 111 for generating the reference clock SP of the PLL is set to a frequency that is two digits (ten times) or more as high as the line recording frequency (frequency of the main scanning start reference signal BD).

The relation between the virtual main scanning timing signal BD' and the actual main scanning line sync signal BD is set to the relation such that they are always deviated by only the attaching phase of the magnetized pattern of the rotor which is fixedly attached to the motor axis of the polygon motor 117 and the polygon mirror 3. Therefore, as for the line recording to the photosensitive drum 5 as well, since the latent image is formed so as to always have a predetermined relation every color for the ITOP signal, there is no color deviation of the recording image.

Figure 12A:
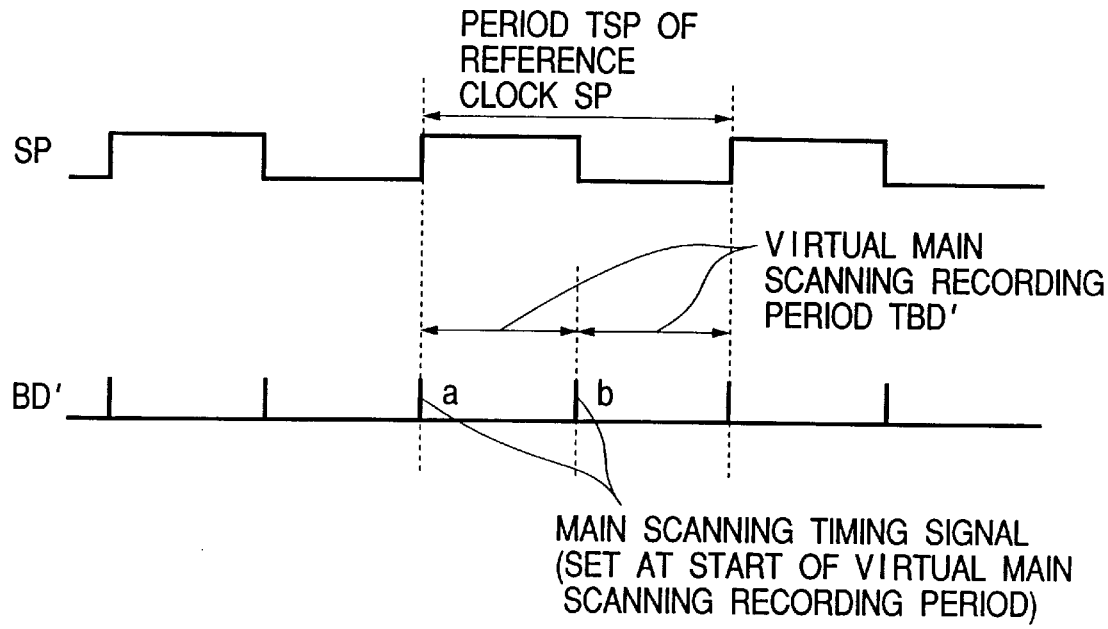
FIGS. 12A and 12B are timing charts showing the relation between the reference clock SP from the counter shown in FIG. 1 and the main scanning timing signal BD' which is defined by the reference clock SP.

FIGS. 12A and 122 are timing charts showing the relations between the reference clock SP from the counter 83 shown in FIG. 1 and the main scanning timing signal BD' which is defined by the reference clock SP.

Figure 12B:
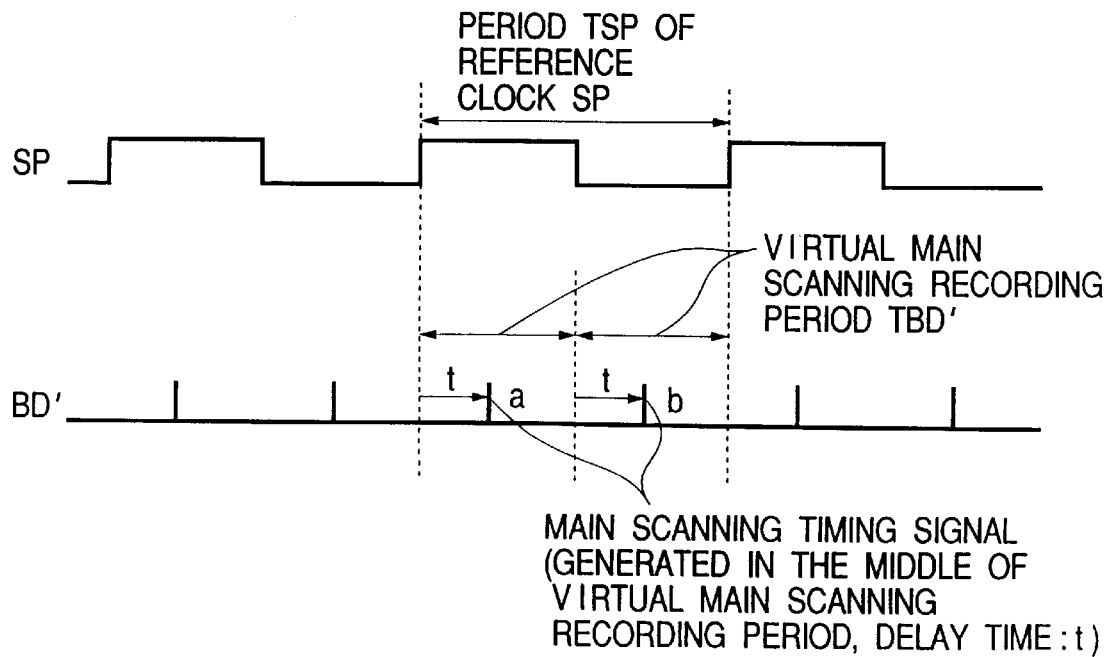

FIG. 12A shows a case (case in the embodiment) where the main scanning timing signal BD' is defined at the head of the virtual main scanning recording period TBD'. FIG. 12B shows a case where the main scanning timing signal BD' is defined at the position that is delayed from the head of the virtual main scanning recording period TDB' by time t.

The number of planes of the rotary polygon mirror is set to the number of reference clocks which are generated by the rotary polygon mirror driving means per rotation or a value which is integer times as large as the number of FG pulses whose phase is matched with the reference clocks. The reference clock generating means virtually decides the main scanning recording periods obtained by dividing one period of the reference clocks by the above integer every period of the reference clocks and also decides the main scanning timing of each virtual main scanning recording period. In accordance with the input of the sub scanning sync signal from the sub scanning sync signal generating means of each color, the reference clock generating means determines the main scanning timing which is the most neighboring with respect to the time among a plurality of main scanning timings of every virtual main scanning recording period corresponding to the reference clocks generated at such a time point and can control the generation of the reference clocks so that the most neighboring main scanning timing always has a predetermined phase for the sub scanning sync signal input.

In the embodiment, the virtual main scanning recording period TBD' and main scanning timing signal BD' as much as two lines are defined in the reference clock SP period TSP of the PLL. In the virtual main scanning recording period, the phase of the main scanning timing signal BD' can arbitrarily exist at any position in the virtual main scanning recording period TBD' as shown in FIG. 12A so long as it is a predetermined position.

In the embodiment, the phase matching of the PLL reference clock SP for the leading edge of the sub scanning signal ITOP is delayed in the flip-flop circuits 112 and 113 as shown in FIGS. 10A, 10B, 11A, and 11B by the time (about one clock) which is required to generate the ITOPST signal. However, a delay amount in this case can be arbitrarily set to any value so long as it is equal to a predetermined number of clocks of the oscillator 111 for the ITOPST signal.

In the first embodiment, the number of planes of the polygon mirror 3 has been set to "8" and the number of pulses of the FG signals which are generated per rotation of the polygon motor 117 has been set to "4". However, it is also possible to construct such that the number of planes of the polygon mirror is equal to "8" and the number of pulses of the FG signals which are generated per rotation of the polygon motor is equal to "2". Such an embodiment will now be described hereinbelow.

Figure 13:
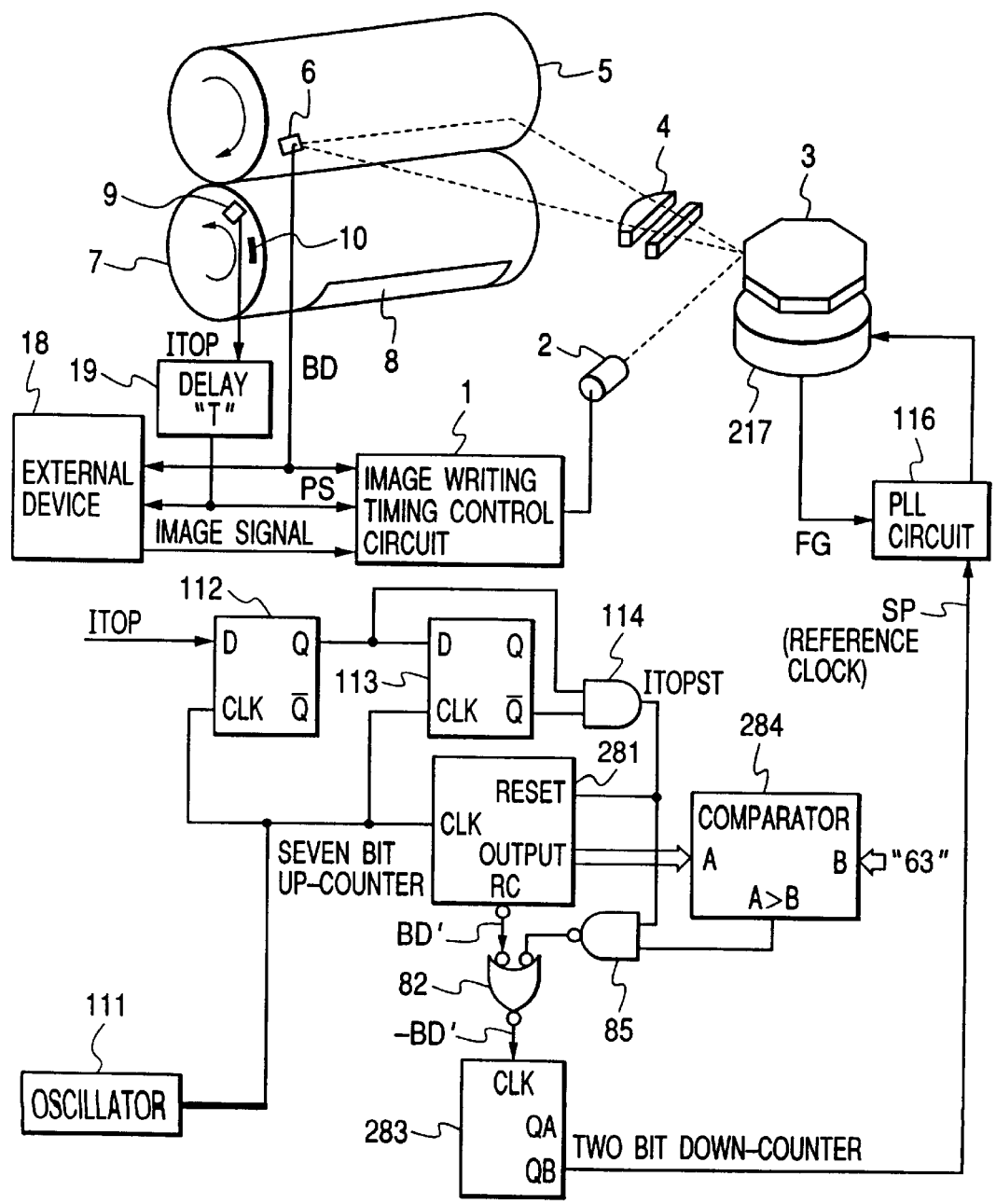
FIG. 13 is a diagram for explaining a construction of an image forming apparatus showing the second embodiment of the invention.

FIG. 13 is a diagram for explaining a construction of an image forming apparatus showing the second embodiment of the invention and the same component elements as those shown in FIG. 1 are designated by the same reference numerals.

In the diagram, reference numeral 217 denotes a polygon motor for rotating the polygon mirror 3 of, for example, an octahedron which is axially supported. Reference numeral 281 denotes an up-counter of, for instance, seven bits (7-bit up-counter) for counting the number of clock signals from the oscillator 111. The up-counter 281 outputs a count value to a comparator 284, and up-counts a period of time corresponding to one main scanning line up to "0 to 127". When a count value reaches "127", the up-counter 281 generates RC output signals (become BD' signals, which will be explained hereinlater) at the "L" level as much as one clock to the NOR circuit 82. The ITOPST signal serves as a reset signal of the up-counter 281.

The comparator 284 compares the clock count value of the up-counter 281 which is inputted to an A input terminal with a fixed value "63" which is inputted to a B input terminal, detects that the former half portion of the time corresponding to one main scanning line has been counted (the clock count value which is inputted to A≦the fixed value "63" which is inputted to B), and generates the "L" signal to the NAND circuit 85. The comparator 284 detects that the latter half portion of the time corresponding to one main scanning line has been counted (the clock count value which is inputted to A>the fixed value "63" which is inputted to B), and generates the "H" signal to the NAND circuit 85.

Reference numeral 283 denotes a down-counter of two bits (2-bit down-counter). The negative OR (becomes a –BD' signal, which will be explained hereinlater) of the output signal from the up-counter 281 and an output signal (decides the phase difference of the BD' signal) from the NAND circuit 85 is inputted from the NOR circuit 82 to a CLK input terminal of the down-counter 283. The down-counter 283 outputs reference clocks (CLK) SP (formed on the basis of the −BD' signal) to PLL control the polygon motor 217 from an upper bit QB output to the PLL circuit 116.

The rotation (main scanning speed) of the polygon motor 217 becomes the same as that in case of the first embodiment by the above construction such that the counter 281 is replaced by the 7-bit up-counter, the threshold value of the comparator 284 is set to "63", the down-counter 283 is replaced by the 2-bit down-counter, and the upper bit output QB is used as a reference clock SP.

Figure 14:
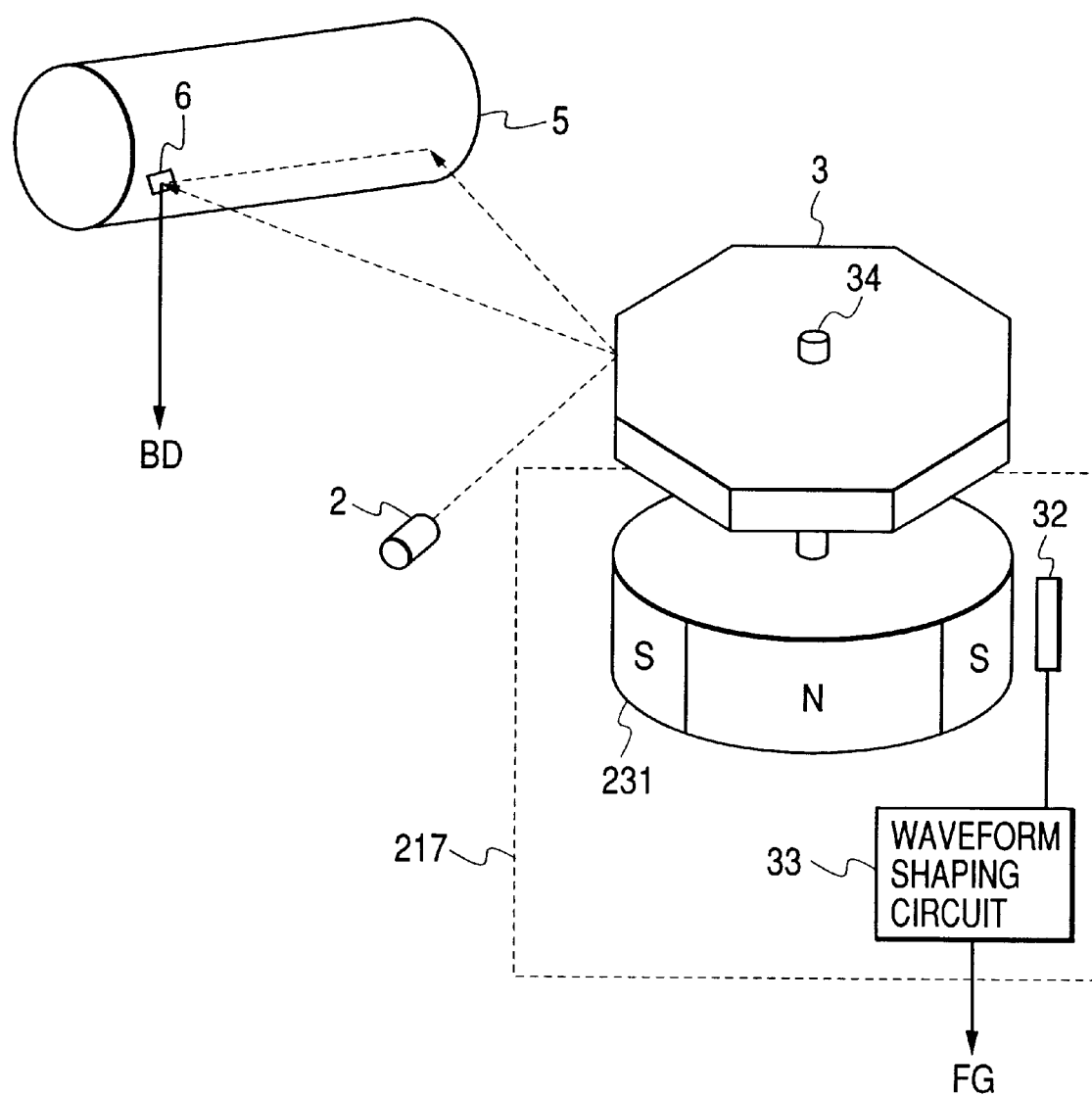
FIG. 14 is a diagram for explaining a construction of a polygon motor shown in FIG. 13.

FIG. 14 is a diagram for explaining a construction of the polygon motor 217 shown in FIG. 13 and the same component elements as those shown in FIG. 1 are designated by the same reference numerals.

In the diagram, reference numeral 231 denotes a rotor of the polygon motor 217 and two sets of magnetic pole patterns per rotation have been magnetized to a permanent magnet. Therefore, as for the FG pulses which are formed by the FG sensor 32 and waveform shaping circuit 33, two FG pulses are outputted per rotation of the polygon motor 217. Four BD signals are generated while one FG pulse is outputted.

FIGS. 15A and 15B are timing charts for explaining the relations between the BD signal from the BD sensor 6 shown in FIG. 14 and the FG signal from the waveform shaping circuit 33. FIG. 15A shows a case where there is no phase difference between the BD signal and the FG signal. FIG. 15B shows a case where there is a phase difference between the BD signal and the FG signal.

As shown in FIG. 14, since the polygon mirror 3 is an octahedron and the magnetic pole pattern of the rotor 231 generates two FG pulses per rotation, four BD signals are generated while one FG signal is outputted.

In the diagram, T0 denotes the phase difference and the BD signal is outputted with the phase difference time T0 while setting the FG signal to a reference. Further, the phase difference time T0 changes depending on the attaching angle of the polygon mirror 3 to the polygon motor 217. When the polygon mirror 3 and polygon motor 217 are once assembled and fixed, the phase difference time T0 is not changed. As shown in FIG. 15A, there is also a case where the phase difference is equal to "0" in dependence on the attaching angle of the polygon mirror 3 and polygon motor 217. Such a phase difference can be set to either "0" or T0 so long as it is always constant.

If the relation of [(the number of FG pulses per rotation of the polygon motor 217)={(the number of planes of the polygon mirror 3)/n (n is a natural number)}] is satisfied, the phase difference time T0 is always constant. In the embodiment, the number of FG pulses (in case of the embodiment, "2") which are generated at regular intervals while the polygon motor 217 rotates once is set to "¼" of the number of planes (in case of the embodiment, "8") of the polygon mirror 3 (namely, in case of n="4").

FIG. 16 is a timing chart for explaining a signal timing of each section shown in FIG. 13 and the same component elements as those shown in FIGS. 15A and 15B are designated by the same reference numerals.

In the diagram, TFG denotes the FG signal period. TBD' indicates the virtual main scanning recording period. Since the FG signal period TFG corresponds to the rotation as much as four planes of the polygon mirror 3, four lines (four periods) are defined as a virtual main scanning period for the leading edge (period TFG of the FG signal) of the FG signal. BD' denotes the main scanning timing signal which is defined at the head in the virtual main scanning recording period TBD' defined as mentioned above. TSP shows the period of the PLL reference clock SP and has a relation such that it is equal to the FG signal period TFG.

The phase difference between the BD signal which is actually detected by the BD sensor 6 and the FG signal is determined by the attaching angle of the polygon mirror 3 to the polygon motor 217. As shown in FIGS. 15A and 15B, the BD signal is generated with a predetermined phase difference T0 for the FG signal. Therefore, the relation between the main scanning timing signal BD' (BD' signal) in the virtual main scanning recording period TBD' and the actual BD signal is always set to the predetermined phase relation T0. The main scanning timing in the virtual main scanning recording period TBD' can be set to a timing with a predetermined phase for the main scanning timing signal BD' and is not limited to the main scanning timing signal BD'.

A process for matching the BD' signal with the ITOP signal will now be described with reference to timing charts of FIGS. 17A to 17D.

FIGS. 17A to 17D are the timing charts for explaining the relations among the ITOP signal from the sensor 9 shown in FIG. 13, the FG signal from the waveform shaping circuit 33, and the main scanning timing signal BD' which is defined by the FG signal.

Although the explanation will be repeated, since the polygon mirror 3 is an octahedron, as for the polygon motor 217, eight BD' signals are defined per rotation (namely, two FG signals). In the embodiment, it is defined that the FG signal and the BD' signal have the same one phase.

In FIGS. 17A to 17D, a denotes a BD' signal which is defined by the leading edge of the FG signal and next main scanning timing signals are sequentially shown by b, c, and d from the signal near a. a+1 denotes a BD' signal which is defined by the leading edge of the FG signal that is one-subsequent to the BD' signal a. A next main scanning timing signal is shown by b+1.

−BD' indicates a BD' signal whose phase has been adjusted by matching the BD' signal with the ITOP signal. −FG shows an FG signal whose phase has been adjusted by matching the FG signal with the ITOP signal. Further, for the BD' signal x (not shown), T(x)B indicates time from the BD' signal x to the ITOP signal which is inputted behind the BD' signal x. T(x)F denotes time from the ITOP signal which is inputted in front of the BD' signal x to the BD' signal x.

Figure 17A:
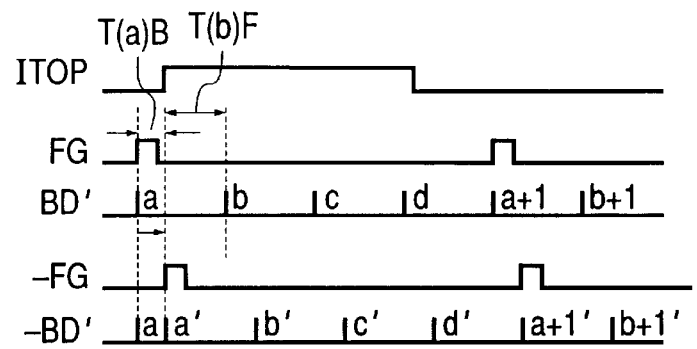
FIGS. 17A, 17B, 17C and 17D are timing charts for explaining the relations among an ITOP signal from a sensor shown in FIG. 13, the FG signal from the waveform shaping circuit, and a main scanning timing signal BD' which is defined by the FG signal.

Particularly, FIG. 17A shows a case where the ITOP signal is inputted between the BD' signal a and the one-subsequent BD' signal b and the relation between the BD' signal a near the ITOP signal and b satisfies T(a)B<T(b+1)F.

Therefore, since the BD' signal a is the most neighboring to the ITOP signal, as shown by the FG signal −FG (−FG signal) and the BD signal −BD' (−BD' signal), the phase adjustment of the FG signal after the leading edge of the ITOP signal is performed so as to obtain a', b', c', d', a−1', and b+1' by matching the phase of the main scanning timing signal (BD' signal) a with the leading phase of the ITOP signal.

Figure 17B:
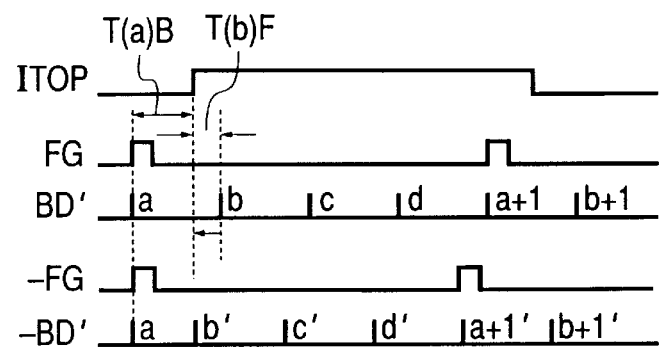

FIG. 17B shows a case where the ITOP signal is inputted between the BD' signal a and the one-subsequent BD' signal b and the relation between the BD' signal a near the ITOP signal and b satisfies T(a)B>T(b)F.

Therefore, since the BD' signal b is the most neighboring to the ITOP signal, as shown by the FG signal −FG and the BD signal −BD', the phase adjustment of the FG signal after the leading edge of the ITOP signal is performed so as to obtain b', c', d', a−1', and b+1' by matching the phase of the main scanning timing signal (BD' signal) b with the leading phase of the ITOP signal.

Figure 17C:
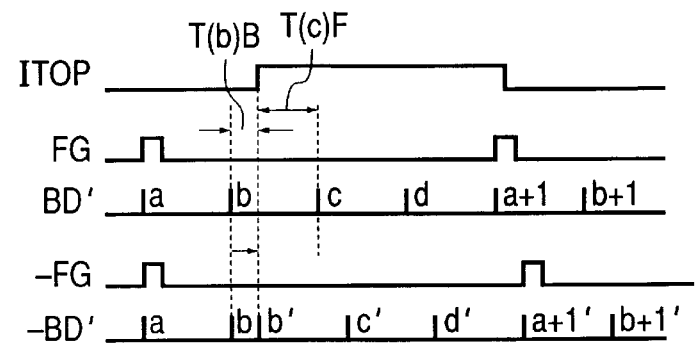

FIG. 17C shows a case where the ITOP signal is inputted between the BD' signal b and the one-subsequent BD' signal c and the relation between the BD' signal b near the ITOP signal and c satisfies T(b)B<T(c)F.

Therefore, since the BD' signal b is the most neighboring to the ITOP signal, as shown by the FG signal −FG and the BD signal −BD', the phase adjustment of the FG signal after the leading edge of the ITOP signal is performed so as to obtain c', d', a−1', and b+1' by matching the phase of the main scanning timing signal (BD' signal) c with the leading phase of the ITOP signal.

Figure 17D:
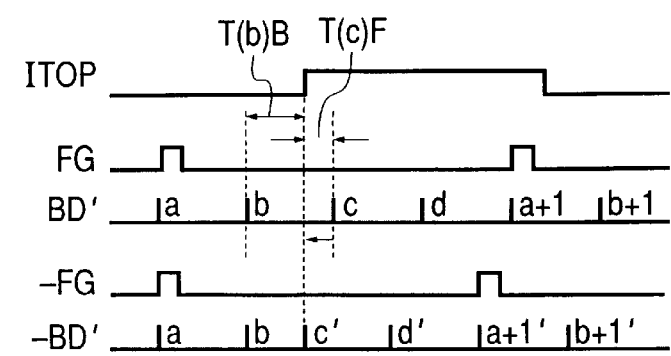

FIG. 17D shows a case where the ITOP signal is inputted between the BD' signal b and the one-subsequent BD' signal c and the relation between the BD' signal b near the ITOP signal and c satisfies T(b)B<T(c)F.

Therefore, since the BD' signal c is the most neighboring to the ITOP signal, as shown by the FG signal −FG and the BD signal −BD', the phase adjustment of the FG signal after the leading edge of the ITOP signal is performed so as to obtain c', d', a−1', and b+1' by matching the phase of the main scanning timing signal (BD' signal) c with the leading phase of the ITOP signal.

With the above method, the virtual main scanning sync signal BD' which is the most neighboring to the input of the ITOP signal among the virtual main scanning sync signals BD' which are defined by the FG signal for the ITOP signal which is outputted from the sensor 9 every recording color is matched with the phase of the ITOP signal, thereby minimizing the phase adjustment of the FG signal matched with the ITOP signal and completing the adjustment of the rotational phase of the polygon motor 217 in the shortest time. A color image of a high quality without a color deviation can be stably formed.

In the stationary rotating state, the phases and periods of the reference clock SP and the FG signal also coincide, respectively. That is, as shown in FIG. 16, the FG signal and the reference clock SP are considered as equivalent signals. In a manner similar to the FG signal, the virtual main scanning recording period TBD' and main scanning timing signal BD' are also defined for the reference clock SP.

Thus, the operation to match the virtual main scanning timing signal BD' which is defined for the FG signal shown in FIGS. 17A to 17D with the ITOP signal is executed by defining the virtual main scanning timing signal BD' for the reference clock SP of the PLL, changing the phase of the reference clock SP for the ITOP signal, and matching the virtual main scanning timing signal BD' to the ITOP signal.

The control operation to match the phase of the reference clock SP with the ITOP signal will now be described with reference to timing charts of FIGS. 18A to 18D.

FIGS. 18A to 18D are the timing charts for explaining the relations among the ITOP sinal from the sensor 9 shown in FIG. 13, the reference clock SP from the counter 283, and the main scanning timing signal BD' which is defined by the reference clock SP.

In FIGS. 18A to 18D, a denotes a BD' signal which is defined by the leading edge of the FG signal and next main scanning timing signals are sequentially shown by b, c, and d from the signal near a. a+1 denotes a BD' signal which is defined by the leading edge of the FG signal that is one-subsequent to the BD' signal a. A next main scanning timing signal is shown by b+1.

−SP indicates a reference clock SP signal whose phase has been adjusted by matching the reference clock SP with the ITOP signal. −BD' shows a BD' signal whose phase has been adjusted by matching the BD' signal with the ITOP signal. Further, for the BD' signal x (not shown), T(x)B indicates time from the BD' signal x to the ITOP signal which is inputted behind the BD' signal x. T(x)F denotes time from the ITOP signal which is inputted in front of the BD' signal x to the BD' signal x.

The phase adjustment of the reference clock SP will now be specifically described hereinbelow.

First, the main scanning timing signal BD' which is decided at the head of every virtual main scanning recording periods as many as four lines which are defined in the reference clock SP period of the PLL is defined. Among the virtual main scanning timing signals BD' in the reference clock SP generated when the ITOP signal is inputted, the virtual main scanning timing signal which is the most neighboring to the input of the leading edge of the ITOP signal is selected. As shown by the SP signal −SP (−SP signal) and the BD signal −BD' (−BD' signal), after the leading edge of the ITOP signal, the generation phase of the reference clock SP is controlled for the leading edge of the ITOP signal so that the selected main scanning timing signal BD' reaches in response to the leading edge of the ITOP signal.

Figure 18A:
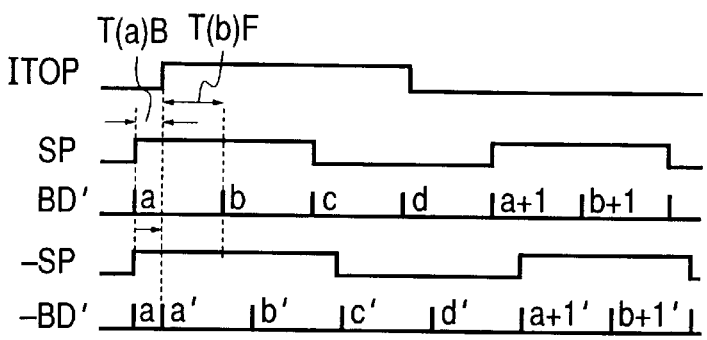
FIGS. 18A, 18B, 18C and 18D are timing charts for explaining the relations among the ITOP signal from the sensor shown in FIG. 13, a reference clock SP from a counter, and the main scanning timing signal BD' which is defined by the reference clock SP.

Particularly, FIG. 18A shows a case where the ITOP signal is inputted between the BD' signal a and the one-subsequent BD' signal b and the relation between the BD' signal a near the ITOP signal and b satisfies T(a)B<T(b)F, and corresponds to FIG. 17A.

Therefore, since the BD' signal a is the most neighboring to the ITOP signal, as shown by the SP signal −SP and the BD signal −BD', the phase adjustment of the reference clock SP after the leading edge of the ITOP signal is executed so as to obtain a', b', c', d', a+1', and b+1' by matching the phase of the main scanning timing signal (BD' signal) a with the leading phase of the ITOP signal.

Figure 18B:
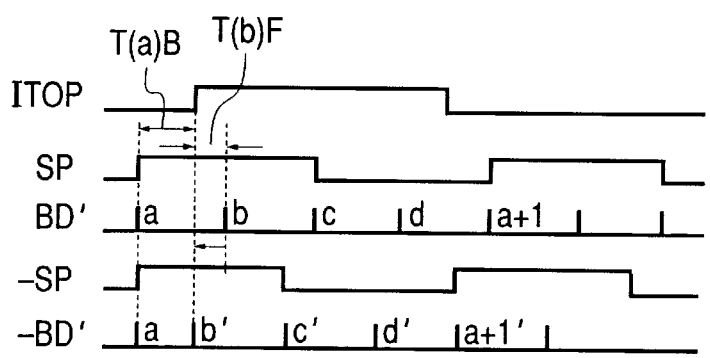

FIG. 18B shows a case where the ITOP signal is inputted between the BD' signal a and the one-subsequent BD' signal b and the relation between the BD' signal a near the ITOP signal and b satisfies T(a)B>T(b)F, and corresponds to FIG. 17B.

Therefore, since the BD' signal b is the most neighboring to the ITOP signal, as shown by the SP signal −SP and the BD signal −BD', the phase adjustment of the reference clock SP after the leading edge of the ITOP signal is performed so as to obtain b', c', d', a+1', and b+1' by matching the phase of the main scanning timing signal (BD' signal) b with the leading phase of the ITOP signal.

Figure 18C:
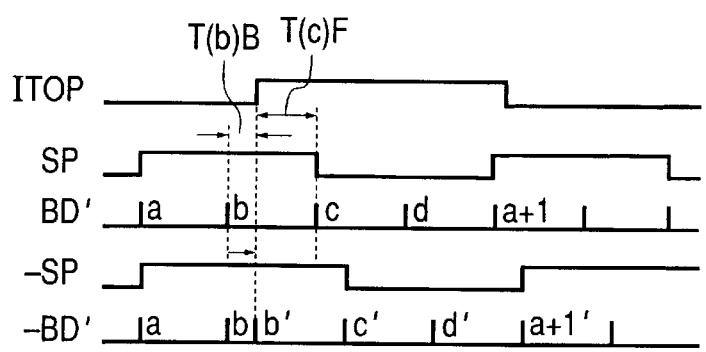

FIG. 18C shows a case where the ITOP signal is inputted between the BD' signal b and the one-subsequent BD' signal c and the relation between the BD' signal b near the ITOP signal and c satisfies T(b)B>T(c)F, and corresponds to FIG. 17C.

Therefore, since the BD' signal b is the most neighboring to the ITOP signal, as shown by the SP signal −SP and the BD signal −BD', the phase adjustment of the reference clock SP after the leading edge of the ITOP signal is performed so as to obtain b', c', d', a+1', and b+1' by matching the phase of the main scanning timing signal (BD' signal) b with the leading phase of the ITOP signal.

Figure 18D:
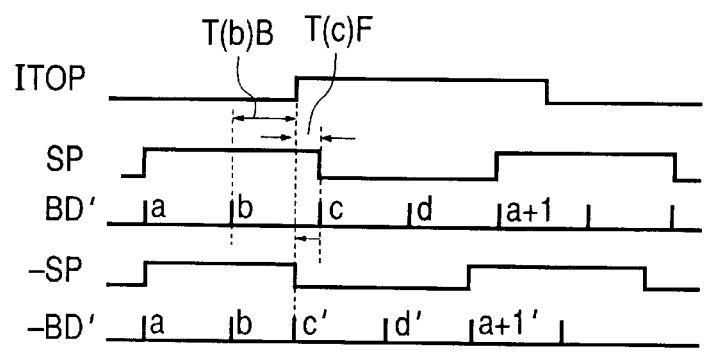

FIG. 18D shows a case where the ITOP signal is inputted between the BD' signal b and the one-subsequent BD' signal c and the relation between the BD' signal b near the ITOP signal and c satisfies T(b)B>T(c)F, and corresponds to FIG. 17D.

Therefore, since the BD' signal b is the most neighboring to the ITOP signal, as shown by the SP signal –SP and the BD signal –BD', the phase adjustment of the reference clock SP after the leading edge of the ITOP signal is performed so as to obtain b', c', d', a–1', and b+1' by matching the phase of the main scanning timing signal (BD' signal) c with the leading phase of the ITOP signal.

With the above method, the virtual main scanning sync signal BD' which is the most neighboring to the input of the ITOP signal among the virtual main scanning sync signals BD' which are defined by the reference clock SP for the ITOP signal which is outputted from the sensor 9 every recording color is matched with the phase of the ITOP signal, thereby enabling the phase adjustment of the reference clock SP matched with the ITOP signal to be minimized.

The PLL circuit 116 drives the polygon motor 217 so as to match the phase of the adjusted reference clock SP with the phase of the FG signal of the polygon motor 217. Thus, the adjustment of the rotational phase of the polygon motor 217 such that the phase of the virtual main scanning sync signal BD' which is the most neighboring to the input of the ITOP signal among the virtual main scanning sync signals BD' which are defined by the FG signal for the ITOP signal which is outputted by the sensor 9 every recording color is matched with the phase of the ITOP signal can be completed in the shortest time. A color image of a high quality without a color deviation can be stably formed.

The phase adjusting operation of the reference clock SP due to the input of the ITOP signal will now be described hereinbelow with reference to FIGS. 19 to 24.

Figure 19:
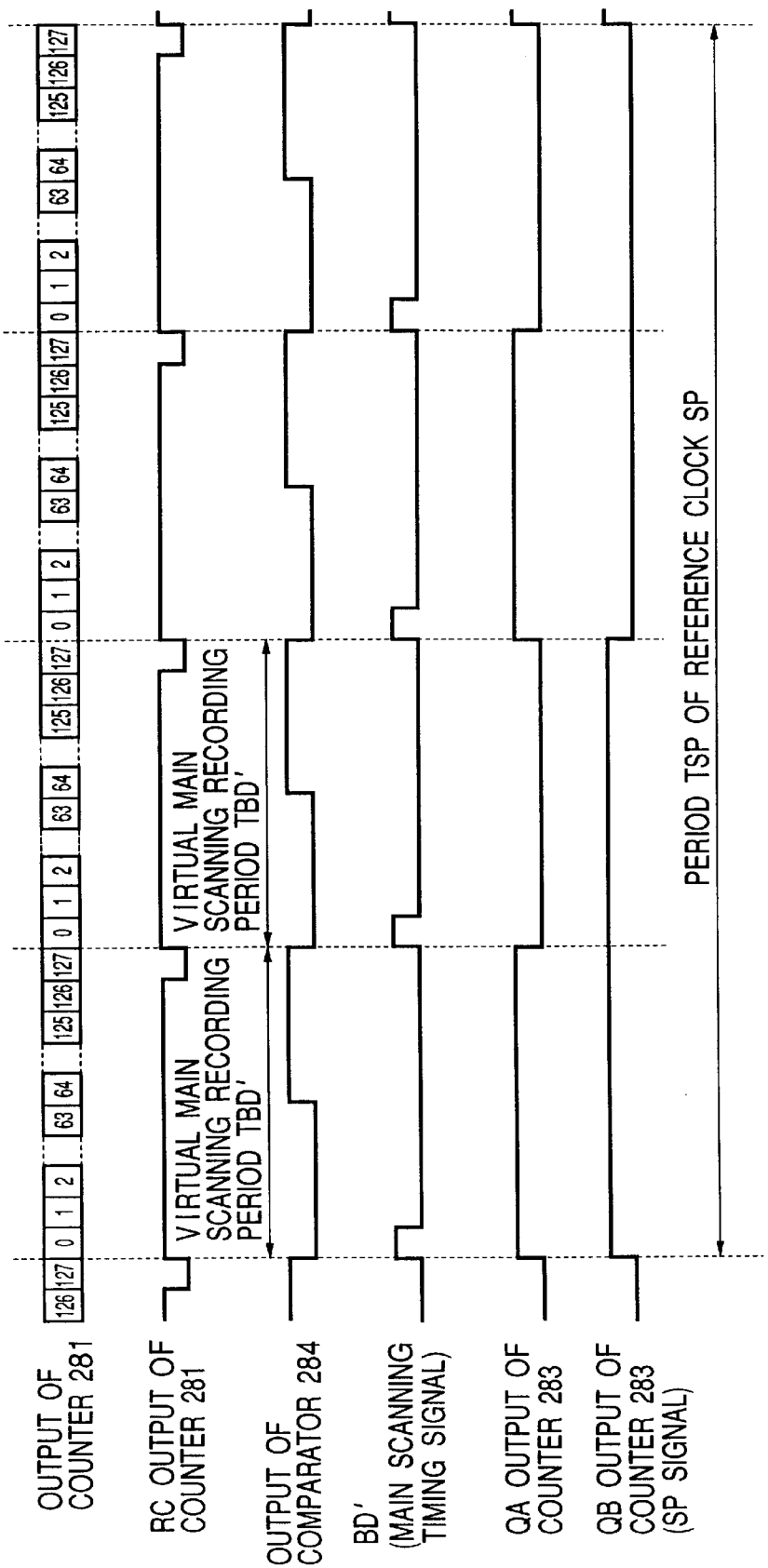
FIG. 19 is a timing chart for explaining the operation in each section shown in FIG. 13.

FIG. 19 is a timing chart for explaining the operation of each section shown in FIG. 13.

In the diagram, the up-counter 281 receives the clocks of "645.03937 kHz" from the oscillator 111 as mentioned above and counts "128" clocks (virtual main scanning recording periods TBD') of "0 to 127".

When the up-counter 281 counts up to "127" (namely, at the end of the virtual main scanning recording period TBD'), RC output signals at the "L" level as many as one clock are generated and are inputted to a clock input terminal of the 2-bit down-counter 283 for outputting the SP signal through the negative OR gate (NOR gate) 82. The reference clock SP in which the virtual main scanning recording periods TBD' of four lines are set to one period (namely, the same period as the FG signal) is generated from the QB output terminal of the down-counter 283.

As mentioned above, in the embodiment, the QB output of the down-counter 283 is the reference clock SP of the PLL corresponding to the FG signal and the main scanning recording period TBD' is virtually determined by the 7-bit up-counter 281 which circulates four times in one period of the reference clock SP. It is defined that the main scanning timing signal BD' is generated when the count value of the up-counter 281 is equal to "0" (namely, at the start of the virtual main scanning recording period TBD'). Further, the comparator 284 generates the "L" signal when the up-counter 281 counts the former half portion ("0 to 63") of one period. When the up-counter 281 counts the latter half portion ("64 to 127") of one period, the comparator 284 outputs the "H" signal.

When the ITOP signal is inputted in an interval when the output of the comparator 284 is at the "L" level, the phase adjustment of the reference clock SP is performed by returning (resetting) the up-counter 281 to "0" so as to regenerate the head main scanning timing signal BD' (which has already been generated) of the virtual main scanning recording period TBD' which is at present being counted by the up-counter 281 at the time of the input of the ITOP signal in response to the leading edge of the inputted ITOP signal.

On the other hand, when the ITOP signal is inputted in an interval when the output of the comparator 284 is at the "H" level, since the main scanning timing signal BD' at the head of the next period of the virtual main scanning recording period TBD' which is at present being counted by the up-counter 281 is nearer, the up-counter 281 is returned to "0" so as to make the next virtual main scanning recording period TBD' correspond to the leading edge of the inputted ITOP signal and the QA output of the down-counter 283 is inverted by the CLK input to the down-counter 283, thereby performing the phase adjustment of the reference clock SP.

FIGS. 20 to 23 are timing charts for explaining the operation in each section shown in FIG. 13 and the same component elements as those shown in FIGS. 18A to 18D are designated by the same reference numerals.

Figure 20:
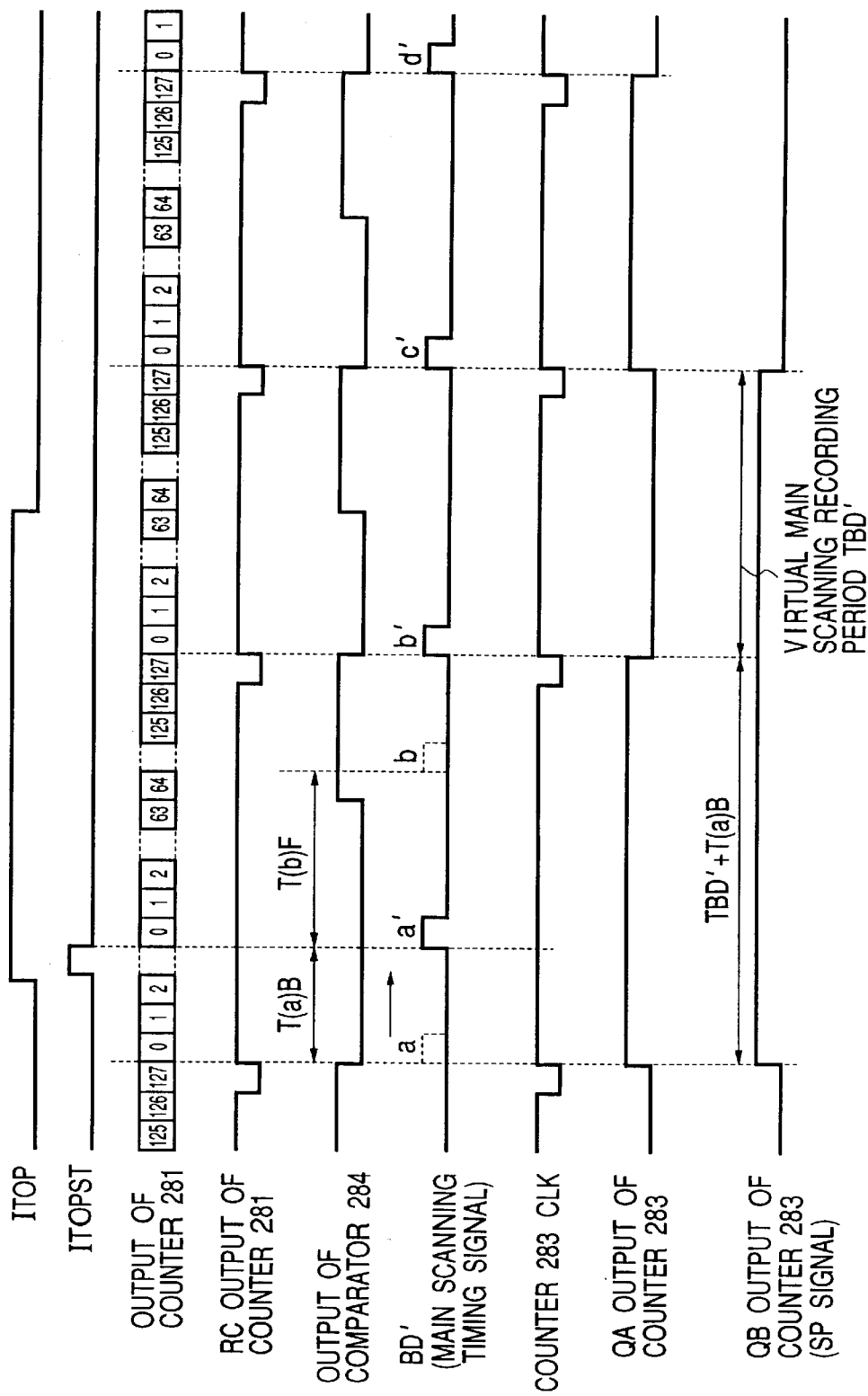
FIG. 20 is a timing chart for explaining the operation in each section shown in FIG. 13.

Particularly, FIG. 20 corresponds to FIG. 18A and shows a case where the phase adjustment of the SP signal is performed so that the main scanning timing signal a (which has already been generated) corresponding to the virtual main scanning recording period which is at present being counted by the up-counter 281 is regenerated as a' for the leading edge of the ITOP signal inputted for an interval when the SP signal is at the "H" level.

In this case, as described in FIG. 18A, time until the head main scanning timing signal a of the virtual main scanning recording period which is at present being counted by the up-counter 281 is equal to T(a)B for the generation of the ITOPST signal as a leading detection signal of the ITOP signal, time until the next main scanning timing signal b is equal to T(b)F, and there is a relation of T(a)B<T(b)F. Therefore, the phase adjustment of the SP signal is executed so as to make the most neighboring main scanning timing signal a correspond to the ITOPST signal as a leading signal of the ITOP signal.

When T(a)B<T(b)F, namely, a fact that the main scanning timing signal a is the most neighboring to the ITOPST signal is detected by checking that the output of the comparator 284 is at the "L" level when the ITOPST signal is generated.

In this case, since the output of the comparator 284 is at the "L" level at the time of the generation of the ITOPST signal, the NAND gate 85 is not opened and the ITOPST signal is not supplied to the clock terminal of the down-counter 283. Thus, even if the ITOPST signal is generated, the QA output of the counter 283 is held at the "H" level and the present virtual main scanning recording period is restarted in response to the ITOPST signal.

The counter 281 is reset to "0" by the generation of the ITOPST signal and the main scanning timing signal a is generated as a' in correspondence to the ITOPST signal. Thus, the "H" interval of the SP signal corresponding to the input of the ITOPST signal is equal to 2TBD'+T(a)B which is longer than (the ordinary virtual main scanning recording period TBD')×2 by only T(a)B.

The ITOP signal input is delayed by "2" clocks in the flip-flop circuits 112 and 113. The leading edge of the ITOP signal is detected by the AND gate 114 by checking that the Q output of the flip-flop circuit 112 is at the "H" level and the Q output of the flip-flop circuit 113 is at the "L" level, thereby generating the ITOPST signal as a leading detection signal of the ITOP signal.

Figure 21:
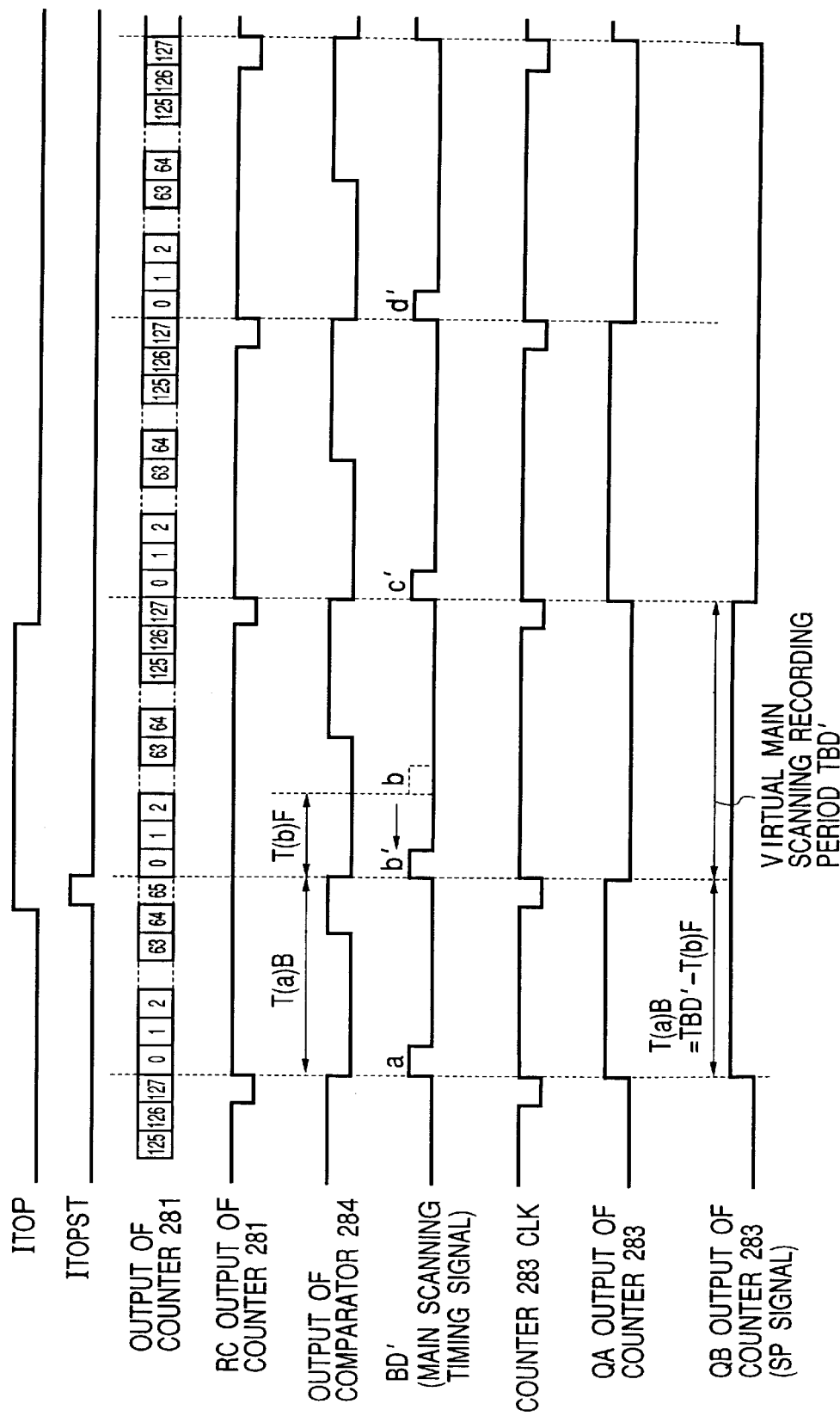
FIG. 21 is a timing chart for explaining the operation in each section shown in FIG. 13.

FIG. 21 corresponds to FIG. 18B and shows a case where the phase adjustment of the SP signal is performed so as to generate the main scanning timing signal b' corresponding to the next virtual main scanning recording period in response to the leading edge of the ITOP signal inputted for an interval when the SP signal is at the "H" level.

In this case, as described in FIG. 18B, time until the head main scanning timing signal a of the virtual main scanning recording period which is at present being counted by the up-counter 281 is equal to T(a)B for the generation of the ITOPST signal as a leading detection signal of the ITOP signal, time until the next main scanning timing signal b is equal to T(b)F, and there is a relation of T(a)B>T(b)F. Therefore, the phase adjustment of the SP signal is executed so as to make the most neighboring main scanning timing signal b correspond to the ITOPST signal as a leading signal of the ITOP signal.

When T(a)B>T(b)F, namely, a fact that the main scanning timing signal b is the most neighboring is detected by checking that the output signal of the comparator 284 is at the "H" level when the ITOPST signal is generated.

In this case, since the output of the comparator 284 is at the "H" level at the time of the generation of the ITOPST signal, the NAND gate 85 is opened and the ITOPST signal is supplied to the clock terminal of the down-counter 283. Thus, the QA output of the counter 283 is changed to the "L" level by the generation of the ITOP signal and the next virtual main scanning recording period is generated in response to the ITOPST signal.

The counter 281 is reset to "0" by the generation of the ITOPST signal and the main scanning timing signal b is generated as b' in correspondence to the ITOPST signal. Thus, the "H" interval of the SP signal before the input of the ITOPST signal is equal to T(a)B+TBD' which is shorter than (the ordinary virtual main scanning recording period TBD')×2 by only T(b)F.

Figure 22:
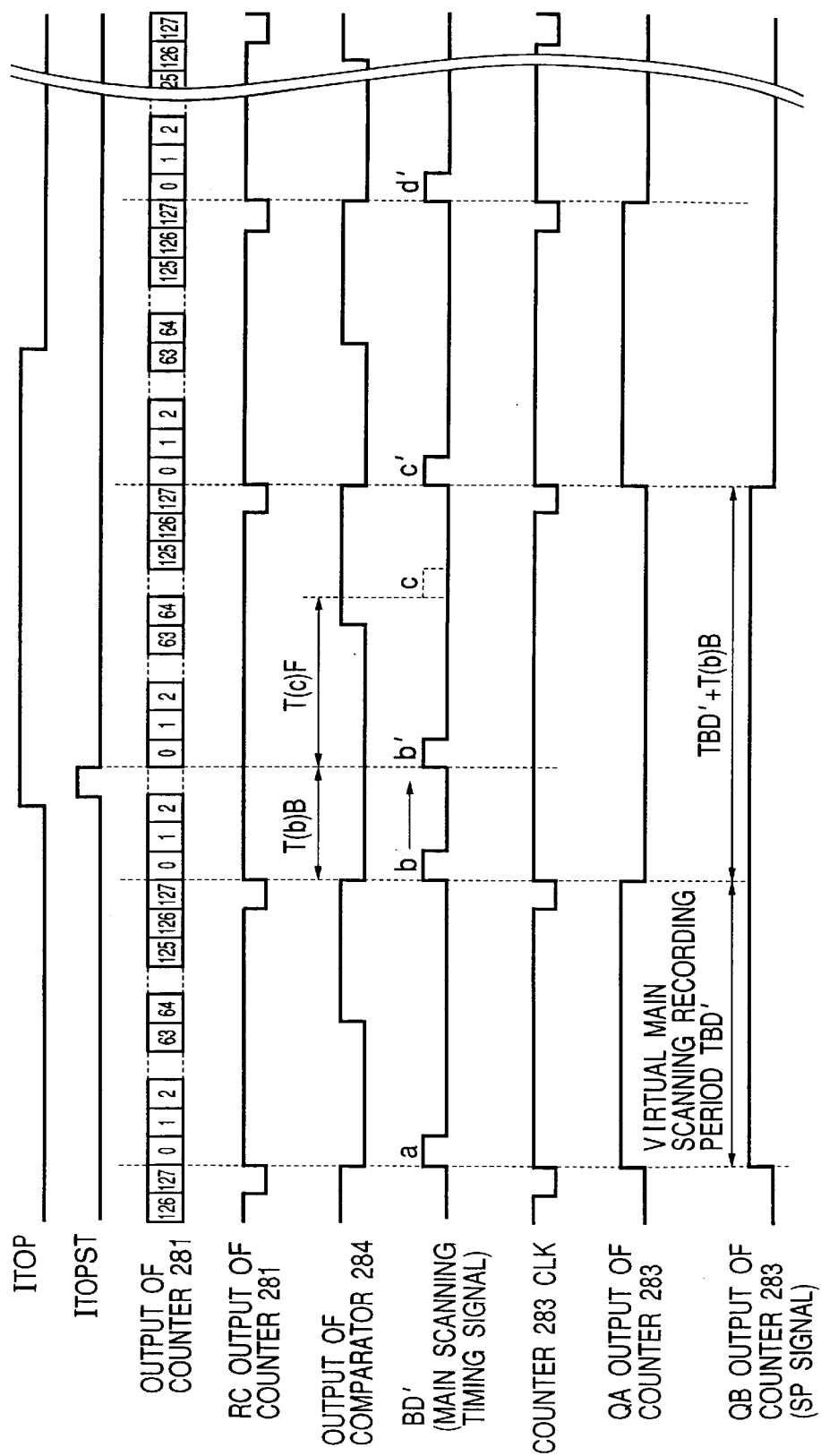
FIG. 22 is a timing chart for explaining the operation in each section shown in FIG. 13.

FIG. 22 corresponds to FIG. 18C and shows a case where the phase adjustment of the SP signal is performed so as to regenerate the main scanning timing signal b corresponding to the virtual main scanning recording period which is at present being counted as b' in response to the leading edge of the ITOP signal inputted for an interval when the SP signal is at the "H" level.

In this case, as described in FIG. 18C, time until the head main scanning timing signal b of the virtual main scanning recording period which is at present being counted by the up-counter 281 is equal to T(b)B for the generation of the ITOPST signal as a leading detection signal of the ITOP signal, time until the next main scanning timing signal c is equal to T(c)F, and there is a relation of T(b)B<T(c)F. Therefore, the phase adjustment of the SP signal is executed so as to make the most neighboring main scanning timing signal b correspond to the ITOPST signal as a leading signal of the ITOP signal.

When T(b)B<T(c)F, namely, a fact that the main scanning timing signal b is the most neighboring to the ITOPST signal is detected by checking that the output of the comparator 284 is at the "L" level when the ITOPST signal is generated.

In this case, since the output of the comparator 284 is at the "L" level at the time of the generation of the ITOPST signal, the NAND gate 85 is not opened and the ITOPST signal is not supplied to the clock terminal of the down-counter 283. Thus, even if the ITOPST signal is generated, the QA output of the down-counter 283 is held at the "L" level and the present virtual main scanning recording period is restarted in response to the ITOP signal.

The up-counter 281 is reset to "0" by the generation of the ITOPST signal and the main scanning timing signal b is generated as b' in correspondence to the ITOPST signal. Thus, the "H" interval of the SP signal correspondence to the input of the ITOPST signal is equal to 2TBD'+T(b)B which is longer than (the ordinary virtual main scanning recording period TBD')×2 by only T(b)B.

Figure 23:
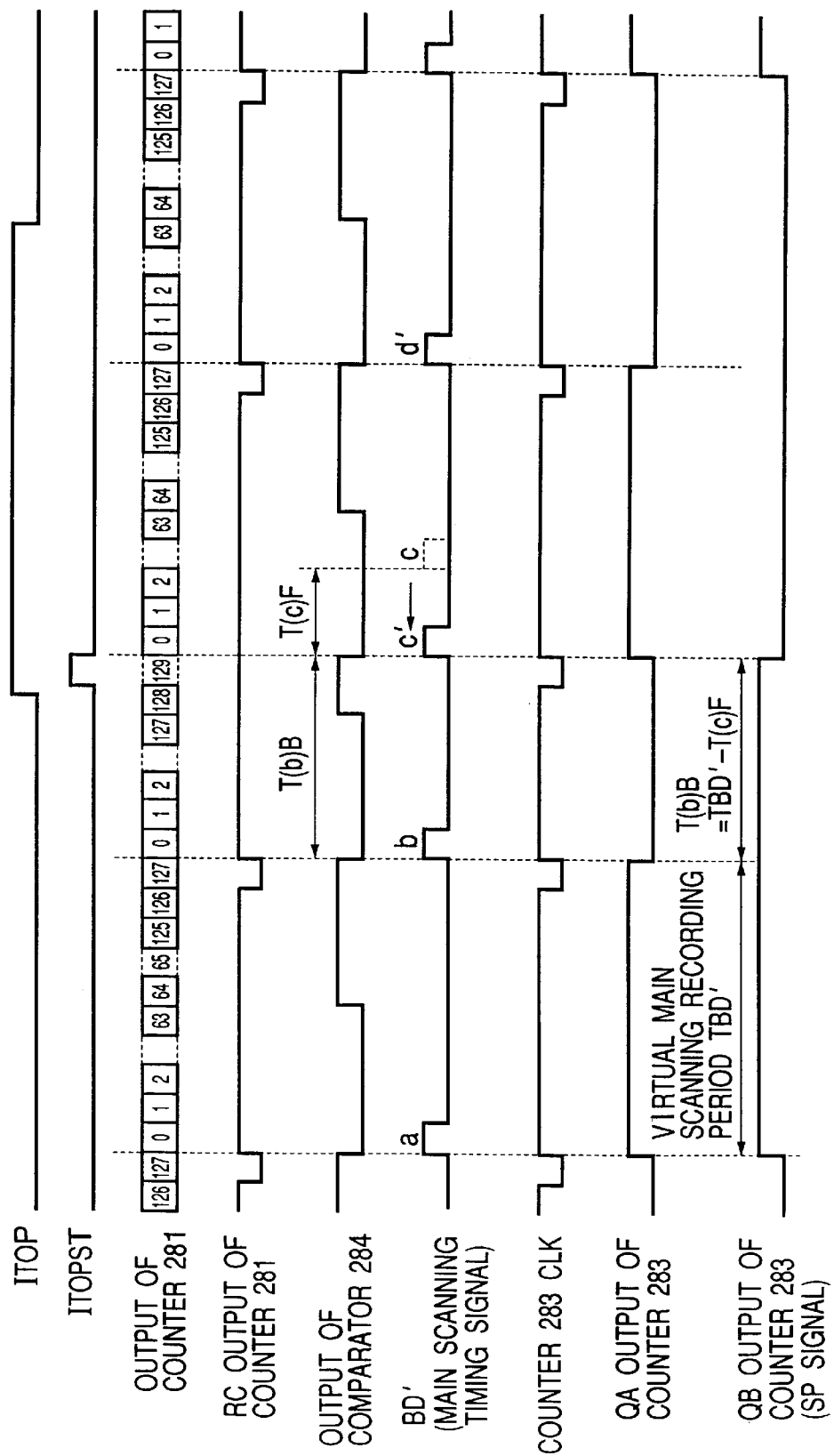
FIG. 23 is a timing chart for explaining the operation in each section shown in FIG. 13.

FIG. 23 corresponds to FIG. 18D and shows a case where the phase adjustment of the SP signal is performed so as to generate the main scanning timing signal a' corresponding to the next virtual main scanning recording period in response to the leading edge of the ITOP signal inputted for an interval when the SP signal is at the "H" level.

In this case, as described in FIG. 18D, time until the head main scanning timing signal b of the virtual main scanning recording period which is at present being counted by the up-counter 281 is equal to T(b)B for the generation of the ITOPST signal as a leading detection signal of the ITOP signal, time until the next main scanning timing signal c is equal to T(c)F, and there is a relation of T(b)B>T(c)F. Therefore, the phase adjustment of the SP signal is executed so as to make the most neighboring main scanning timing signal c correspond to the ITOPST signal as a leading signal of the ITOP signal.

When T(b)B>T(c)F, namely, a fact that the next main scanning timing signal c is the most neighboring is detected by checking that the output signal of the comparator 284 is at the "H" level when the ITOPST signal is generated.

In this case, since the output of the comparator 284 is at the "H" level at the time of the generation of the ITOPST signal, the NAND gate 85 is opened and the ITOPST signal is supplied to the clock terminal of the down-counter 283. Thus, the QA output of the down-counter 283 is changed to the "H" level by the generation of the ITOPST signal and the next virtual main scanning recording period is generated in response to the ITOPST signal.

The up-counter 281 is reset to "0" by the generation of the ITOPST signal and the main scanning timing signal c is generated as c' in correspondence to the ITOPST signal. Thus, the "H" interval of the SP signal before the input of the ITOPST signal is equal to T(b)B+TBD' which is shorter than (the ordinary virtual main scanning recording period TBD')×2 by only T(c)F.

Although the case where the ITOP signal is inputted for the interval when the SP signal is at the "H" level has been described above, a similar phase adjustment is also executed when the ITOP signal is inputted for the "L" level interval of the SP signal.

In the embodiment, two FG signals are generated per rotation of the polygon motor 217 and one FG signal corresponds to four main scanning recording lines (four BD signals).

Further, hitherto, in case of matching the FG signal of the polygon motor with the sub scanning sync signal ITOP signal, the phase adjustment as much as up to "±2" lines is necessary. In the embodiment, however, one period of the FG pulses and the reference clock SP signal to perform the PLL control is divided by the virtual main scanning periods of four lines, the main scanning timing is determined every main scanning recording period, and the main scanning recording timing is matched with the input of the ITOP signal. Therefore, it is sufficient to perform the phase adjustment as much as up to "±0.5" line and the adjustment of the rotational phase of the polygon motor 217 can be performed in the shortest time. Thus, a color image of a high quality without a color deviation can be stably formed.

The errors in the phase adjustment in this instance are determined by the precision at which the ITOP signal as a sub scanning period signal is latched by the clocks from the oscillator 111. The errors are suppressed to up to the errors as much as one clock among the clocks of the oscillator 111.

Since the frequency of the oscillator 111 is 128 times as high as the line recording frequency in the embodiment, the color deviation is corrected at the errors of 1/128 of one line. However, to make the color deviation inconspicuous, the color deviation amount needs to be suppressed to up to 1/10 line. For this purpose, the clock frequency from the oscillator 111 for generating the reference clock SP of the PLL is set to a frequency which is two digits (ten times) or more as high as the line recording frequency.

The relation between the virtual main scanning timing signal BD' and the actual main scanning line sync signal BD is set to the relation such that they are always deviated by only the attaching phase of the magnetized pattern of the rotor which is fixedly attached to the motor axis of the polygon motor 217 and the polygon mirror. Therefore, as for the line recording to the photosensitive drum 5 as well, since the latent image is formed so as to always have a predetermined relation every color for the ITOP signal as a sub scanning sync signal, there is no color deviation of the recording image.

Figure 24A:
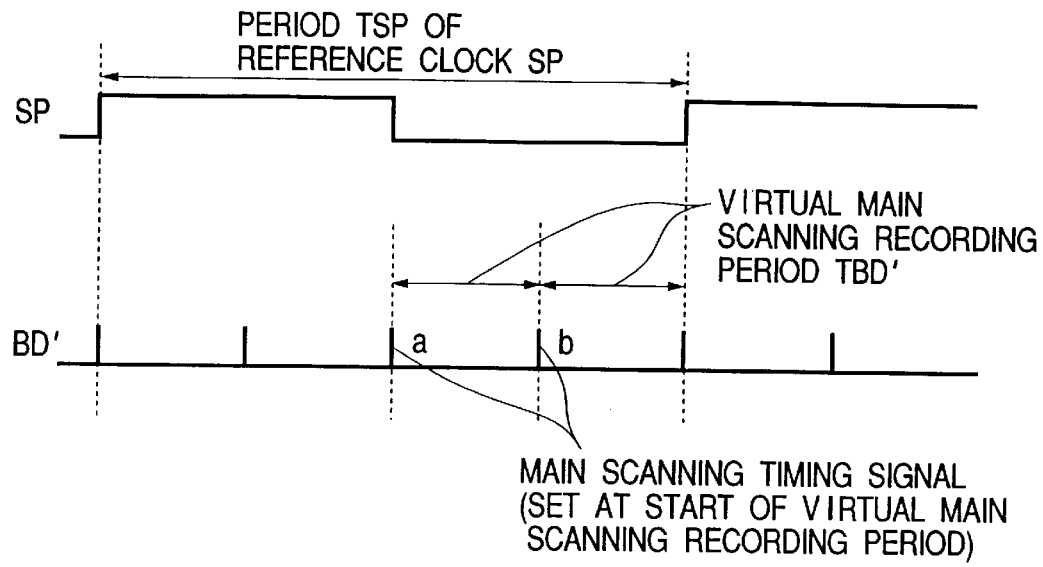
FIGS. 24A and 24B are timing charts showing the relation between the reference clock SP from a down-counter shown in FIG. 13 and the main scanning timing signal BD' which is defined by the reference clock SP.
Figure 24B:
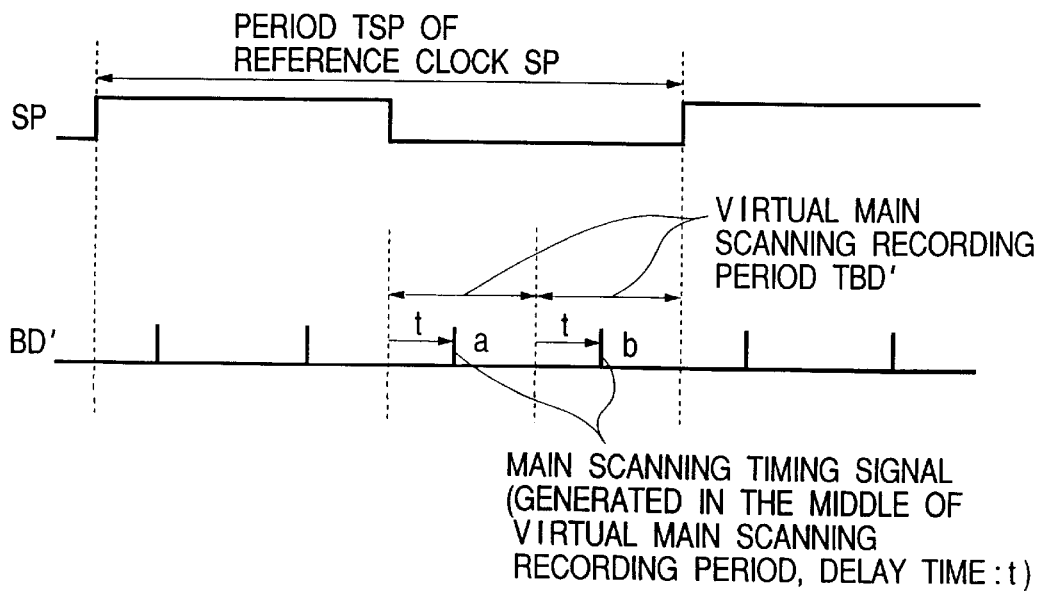

FIGS. 24A and 24B are timing charts showing the relations between the reference clock SP from the down-counter 283 shown in FIG. 13 and the main scanning timing signal BD' which is defined by the reference clock SP.

In the diagram, FIG. 24A shows a case (case of the embodiment) where the main scanning timing signal BD' is defined at the head of the virtual main scanning recording period TBD'. FIG. 24B shows a case where the main scanning timing signal BD' is defined at the position that is delayed from the head of the virtual main scanning recording period TBD' by time t.

In the embodiment, the virtual main scanning recording periods TBD' and main scanning timing signals BD' as many as four lines are defined in the reference clock SP period TSP of the PLL. In the virtual main scanning recording periods, the phase of the main scanning timing signal BD' can be arbitrarily set to any position of the virtual main scanning recording period TBD' as shown in FIG. 24A so long as it is a predetermined position.

In the embodiment, although the phase matching of the PLL reference clock SP with the leading edge of the ITOP signal as a sub scanning signal is delayed in the flip-flop circuits 112 and 113 by the time (about one clock) which is required for generating the ITOPST signal as shown in FIGS. 20 to 23, such a delay amount can be arbitrarily set to a value so long as it corresponds to a predetermined number of clocks among the clocks of the oscillator 111 for the ITOP signal.

In the first and second embodiments, although the PLL control for matching the phases and the frequencies of the FG pulses and reference clock SP which is executed in the PLL circuit 116 has been constructed so as to control by using only the leading edge of the FG pulse, it is also possible to construct so as to perform the PLL control by using both of the leading edge and the trailing edge of the FG pulse. Such an embodiment will now be described hereinbelow.

Figure 25:
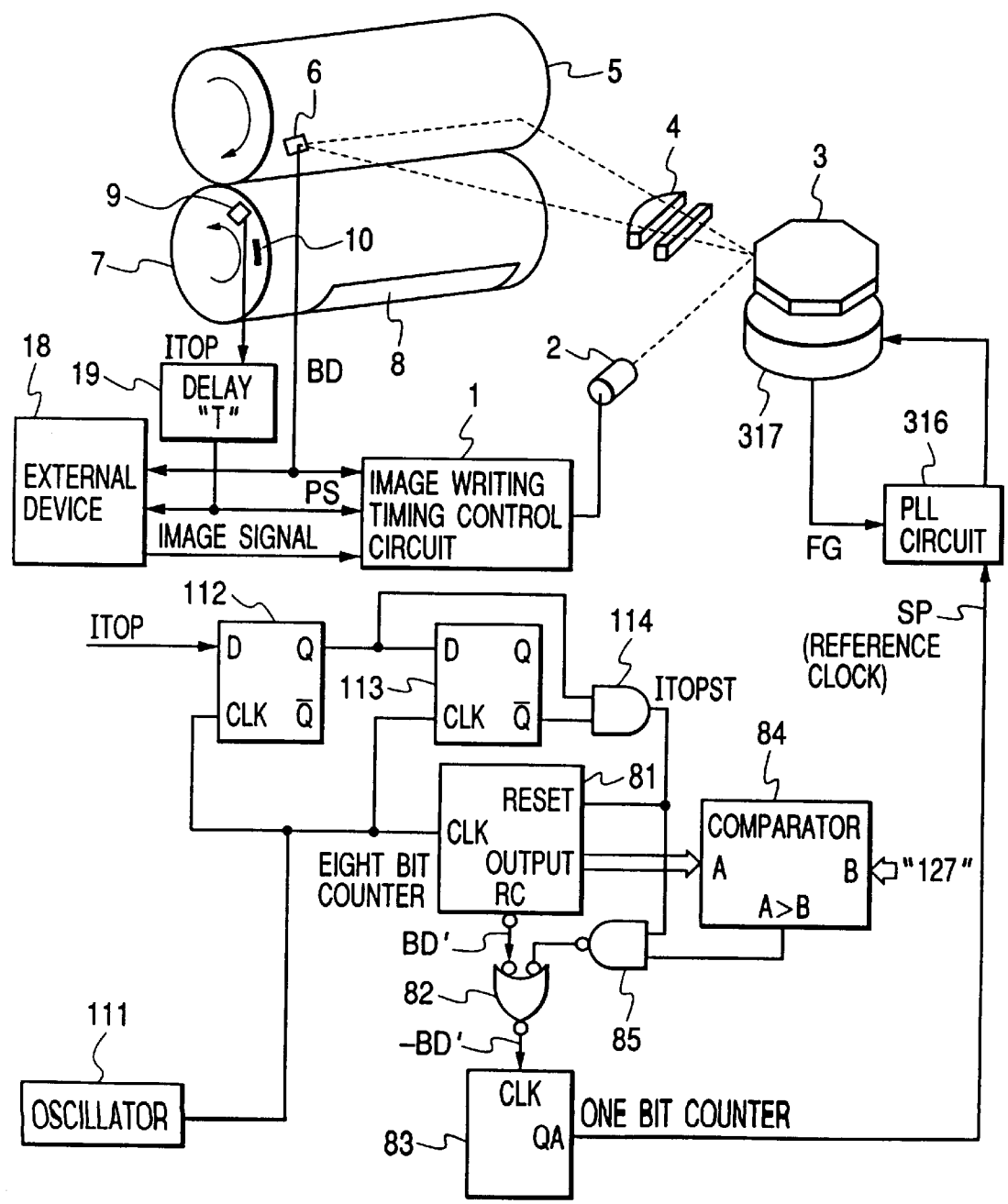
FIG. 25 is a diagram for explaining a construction of an image forming apparatus showing the third embodiment of the invention.

FIG. 25 is a diagram for explaining a construction of an image forming apparatus showing the third embodiment of the invention and the same component elements as those shown in FIG. 1 are designated by the same reference numerals.

In the diagram, reference numeral 317 denotes a polygon motor for rotating the polygon mirror 3 of, for example, an octahedron which is axially supported. Two sets of magnetic pole patterns per rotation have been magnetized on a permanent magnet in the rotor of the polygon motor 317. Two FG pulses are generated per rotation of the polygon motor 317 so that a ratio of the "H" interval and the "L" interval is set to 1:1.

Reference numeral 316 denotes a phase locked loop (PLL) circuit for receiving the reference clock SP which is outputted from the QA terminal of the counter 83 and the FG pulse which is generated from the polygon motor 317 and controlling the driving of the polygon motor 317 so as to always make the phases of the FG pulse and reference clock SP coincide by matching both of the leading edge and trailing edge of the FG pulse with the leading edge of the reference clock SP. That is, two reference clocks SP are generated while one FG pulse is outputted.

Since the polygon mirror 3 is an octahedron mirror, eight BD signals are generated per rotation of the polygon motor 317. That is, four BD signals are outputted while one FG pulse is generated.

Figure 26:
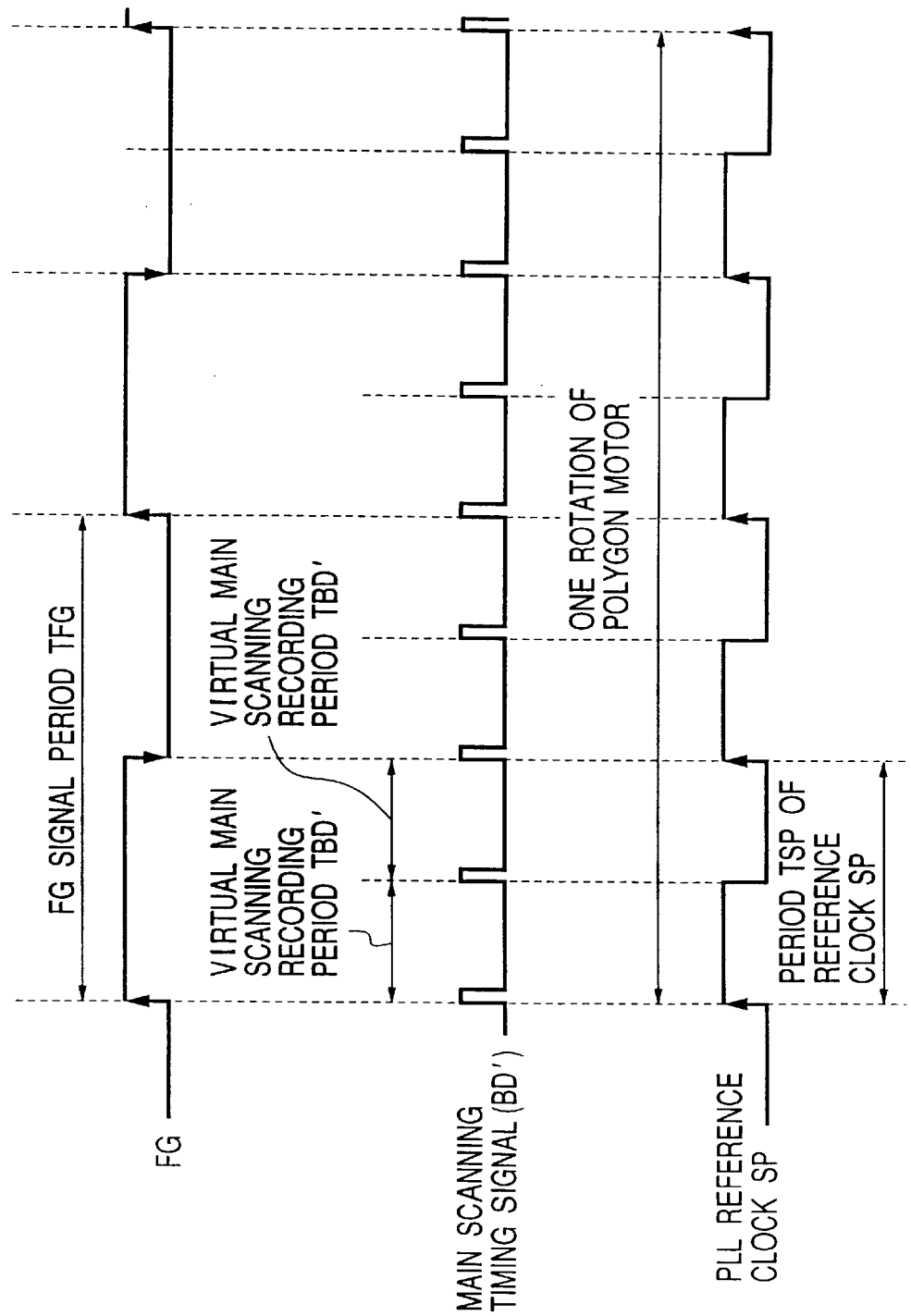
FIG. 26 is a timing chart showing the relation between an FG pulse by a polygon motor and a reference clock SP by a counter.

FIG. 26 is a timing chart showing the relation between the FG pulses by the polygon motor 317 and the reference clock SP by the counter 83.

In the diagram, the TFG pulse corresponds to the FG signal period and two periods correspond to one rotation of the polygon motor 317. TSP denotes the reference clock SP period and four periods correspond to one rotation of the polygon motor 317.

TBD' denotes the virtual main scanning recording period and four lines (four periods) are defined for the FG signal period TFG. That is, two lines are defined for the reference clock SP. BD' indicates the main scanning timing signal and is defined at the head of the virtual main scanning recording period TBD'.

By the above method, even when the number n of FG pulses per rotation is equal to the half of that in the first embodiment, an effect similar to the first embodiment is derived.

The invention is not limited to only the above embodiment but it will be obviously understood that a similar effect is derived so long as there is a relation of "m=N×n (N is a natural number)" between the number n of FG pulses per rotation and the number m of planes of the polygon mirror 3.

Although the above embodiment has been described above with respect to the case of applying the image forming apparatus according to the invention to the color LBP, the invention is not particularly limited to the color LBP. The invention can be also applied to a color digital copying machine for performing an image recording by scanning onto the photosensitive drum by using a polygon mirror.

It will be obviously understood that the object of the invention is accomplished by a method whereby a storing medium in which program codes of software to realize the function of the foregoing embodiment as described above have been recorded is fed to a system or an apparatus and a computer (or a CPU or an MPU) of the system or apparatus reads out the program codes stored in the storing medium and executes them.

In this case, the program codes themselves read out from the storing medium realize the novel function of the invention and the storing medium in which the program codes have been stored constructs the invention.

As a storing medium to supply the program codes, for example, it is possible to use any one of a floppy disk, a hard disk, an optical disk, a magnetooptic disk, a CD-ROM, a CD-R, a magnetic tape, a non-volatile memory card, an ROM, an EEPROM, or the like.

It will be obviously understood that not only a case where the function of the embodiment mentioned above is realized by executing the read-out program codes by the computer but also a case where on the basis of instructions of the program codes, the OS (Operating System) or the like which is working on the computer executes a part or all of the actual processes and the function of the foregoing embodiment is realized by the processes is included.

Further, it will be obviously understood that the invention also incorporates a case where the program codes read out from the storing medium are written into a memory provided for a function expanding board inserted into a computer or a function expanding unit connected to the computer and, after that, on the basis of instructions of the program codes, a CPU or the like provided for the function expanding board or function expanding unit executes a part or all of the actual processes and the function of the foregoing embodiment is realized by the processes.

The invention can be applied to a system constructed by a plurality of equipment or an apparatus comprising one equipment. The invention can be also obviously applied to a case where it is accomplished by supplying programs to the system or apparatus. In this case, programs which are expressed by software to accomplish the invention are stored into a storing medium and are read out to the system or apparatus, thereby enabling the system or apparatus to obtain the effect of the invention.

Further, programs which are expressed by the software to accomplish the invention are down-loaded from a database on the network by a communicating program and are read out, so that the system or apparatus can receive the effect of the invention.

According to the invention as described above, the light beam based on the image information which is inputted is deflected. The rotary polyhedron which is driven by the driving means scans on the image holding material which is rotated. The first pulse generating means detects a predetermined position of the image holding material and generates the first pulse signal. The second pulse generating means generates the predetermined number of second pulse signals in association with the rotation of the driving means for driving the rotary polyhedron. The third pulse generating means generates a predetermined number of virtual main scanning sync signals synchronized with the second pulse signals. The fourth pulse generating means generates the reference signal based on the third pulse signal. The deciding means decides the output timing of the reference signal by comparing the virtual main scanning sync signals which are sequentially generated by the third pulse signal generating means with the first pulse signal. On the basis of the decided output timing, the control means controls the rotational speed of the driving means so that the phase difference between the reference signal which is outputted and the second pulse signal is made constant. Therefore, the adjustment of the rotational phase of the driving means can be completed in a short time.

Further, the deciding means decides the output timing of the reference signal so that the virtual main scanning sync signal that is the most neighboring to the output timing of the first pulse signal among the virtual main scanning sync signals which are sequentially generated from the third pulse signal generating means has a predetermined phase difference from the first pulse signal. Therefore, the phase adjustment of the reference signal is minimized and the adjustment of the rotational phase of the driving means can be completed in a short time.

Therefore, there are advantages such that the minimum phase adjustment is completed in a short time so that the reference signal of the main scanning control system and the reference signal of the sub scanning control system have a predetermined phase, a color image of a high quality without a color deviation can be stably formed, and the like.

The present invention is not limited to the foregoing embodiments but many modifications and variations are possible within the spirit and scope of the appended claims of the invention.

What is claimed is:

1. An image forming apparatus comprising:

a rotary polyhedron for deflecting a light beam based on image information which is inputted and scanning on an image holding material which is rotated;

first pulse generating means for detecting a predetermined position of said image holding material and generating a first pulse signal;

driving means for driving said rotary polyhedron;

second pulse generating means for generating a predetermined number of second pulse signals per rotation of said driving means;

third pulse generating means for generating virtual main scanning sync signals synchronized with said second pulse signals which are generated by said second pulse generating means, the virtual main scanning sync signals being used for controlling a rotational speed of said rotary polyhedron;

fourth pulse generating means for generating a reference signal based on said virtual main scanning sync signals which are generated by said third pulse generating means;

deciding means for deciding an output timing of said reference signal by comparing an output timing of said virtual main scanning sync signals which are sequentially generated by said third pulse generating means with an output timing of said first pulse signal; and control means for controlling a rotational speed of said driving means so that a phase difference between said reference signal which is outputted on the basis of the output timing decided by said deciding means and said second pulse signal is made constant.

2. An apparatus according to claim 1, wherein said deciding means decides the output timing of said reference signal in a manner such that among said virtual main scanning sync signals which are sequentially generated by said third pulse generating means, a timing difference between a one virtual main scanning sync signal that is most neighboring to the output timing of said first pulse signal and said first pulse signal is equal to a predetermined phase difference.

3. An apparatus according to claim 1, wherein the predetermined number of second pulse signals per rotation is obtained by dividing a number of planes of said rotary polyhedron by an integer.

4. An apparatus according to claim 1, wherein a period of said reference signal is an integer multiple of that of said virtual main scanning sync signals.

5. An apparatus according to claim 1, wherein a period of said second pulse signals is the same as a period of said reference signal.

6. An apparatus according to claim 1, wherein a period of said second pulse signals is twice as large as a period of said reference signal.

* * * * *

UNITED STATES PATENT AND TRADEMARK OFFICE
CERTIFICATE OF CORRECTION

PATENT NO.   : 6,049,351
DATED        : April 11, 2000
INVENTOR(S) : JUNICHI NOGUCHI, ET AL.

It is certified that error appears in the above-identified patent and that said Letters Patent is hereby corrected as shown below:

COLUMN 13

Line 57, ""0to" should read --0 to--.

COLUMN 17

Line 41, "122" should read --12B--.

Signed and Sealed this

Fifteenth Day of May, 2001

Attest:

NICHOLAS P. GODICI

Attesting Officer    Acting Director of the United States Patent and Trademark Office